(12) United States Patent
Ikeda et al.

(10) Patent No.: US 6,949,298 B2
(45) Date of Patent: Sep. 27, 2005

(54) BLOCK COPOLYMER AND THERMOPLASTIC RESIN COMPOSITION

(75) Inventors: Kaoru Ikeda, Okayama (JP); Hiroshi Kawai, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 29 days.

(21) Appl. No.: 10/466,770

(22) PCT Filed: Jan. 30, 2002

(86) PCT No.: PCT/JP02/00700

§ 371 (c)(1),
(2), (4) Date: Aug. 1, 2003

(87) PCT Pub. No.: WO02/060961

PCT Pub. Date: Aug. 8, 2002

(65) Prior Publication Data

US 2004/0220366 A1 Nov. 4, 2004

(30) Foreign Application Priority Data

Feb. 1, 2001 (JP) ........................................ 2001-025555
Feb. 1, 2001 (JP) ........................................ 2001-025556

(51) Int. Cl.[7] .............................. B32B 27/28; C08F 8/00
(52) U.S. Cl. ........................ 428/521; 428/517; 525/57; 525/98; 525/332.9; 525/337
(58) Field of Search ........................ 525/57, 98, 332.9, 525/337, 232; 428/517, 521

(56) References Cited

U.S. PATENT DOCUMENTS

| 4,882,384 A | * 11/1989 | Willis et al. ................. 525/105 |
| 5,466,748 A | 11/1995 | Ikeda et al. |
| 5,571,871 A | 11/1996 | Ikeda et al. |

FOREIGN PATENT DOCUMENTS

| EP | 0 592 240 | 4/1994 |
| EP | 616010 | 9/1994 |
| EP | 1 090 953 | 4/2001 |
| JP | 7-329252 | 12/1995 |
| JP | 8-81517 | 3/1996 |
| JP | 9-263608 | 10/1997 |

* cited by examiner

*Primary Examiner*—Fred Teskin
(74) *Attorney, Agent, or Firm*—Oblon, Spivak, McClelland, Maier & Neustadt, P.C.

(57) ABSTRACT

A styrene/hydrogenated diene block copolymer characterized in that it has in side chains at least one kind of functional groups selected from the group consisting of a boronic acid group and a boron-containing group capable of converting into a boronic acid group in the presence of water, the content of the functional groups in the copolymer is 100 to 2,000 μeq/g, and the weight ratio of the styrene units to hydrogenated diene units contained in the copolymer is from 5/95 to 70/30. By thus incorporating a sufficient amount of boron-containing groups, a highly reactive styrene/hydrogenated diene block copolymer is provided.

25 Claims, 2 Drawing Sheets

A $^1$H-NMR CHART OF SEBS HAVING A BORON-CONTAINING GROUP OBTAINED IN EXAMPLE 12.

A $^1$H-NMR CHART OF SEPS HAVING A BORON-CONTAINING GROUP OBTAINED IN EXAMPLE 16.

BLOCK COPOLYMER AND THERMOPLASTIC RESIN COMPOSITION

TECHNICAL FIELD

The present invention relates to a block copolymer having a highly reactive functional group and to a thermoplastic resin composition containing the block copolymer. The present invention also relates to a method for producing the block copolymer and to a multilayer structure.

BACKGROUND ART

For the purpose of imparting additional functions to a polymer material while maintaining its performance, introduction of a small amount of reactive functional groups to the polymer compounds has conventionally been made. For styrene-hydrogenated diene block copolymers having high performance as thermoplastic elastomer, attempts to introduce reactive functional groups thereto have been made and there has been known a technology to introduce reactive functional groups such as hydroxyl groups, acid anhydride groups and boronic acid groups in order to improve, for example, the compatibility and adhesiveness to other resins. Of the reactive functional groups to be employed for this purpose, a boronic acid group and boron-containing groups similar thereto are superior to other functional groups because of their high reactivities.

Japanese Unexamined Patent publication No. 7-25198 (U.S. Pat. No. 5,571,871) discloses a styrene-hydrogenated diene block copolymer having a boron-containing group, such as a boronic acid group, at its terminal. Japanese Unexamined Patent Publication No. 6-340783 (U.S. Pat. No. 5,466,748) discloses a resin composition comprising the above described styrene-hydrogenated diene block copolymer and an ethylene-vinyl alcohol copolymer (hereinafter, abbreviated as EVOH). In these publications, what is disclosed as a method for introducing a boron-containing group into a styrene-hydrogenated diene block copolymer is a method of adding that group to an anion polymerization terminal.

Further, Japanese Unexamined Patent Publication No. 9-263608 discloses a method for producing a boron-containing thermoplastic resin, the method being characterized by allowing a boron compound having a boron-hydrogen bond to react with a thermoplastic resin having double bonds in an amount of not less than 0.0001 meq/g in an extruder and subsequently adding a compound having one or two hydroxyl groups in the molecule and having a boiling point of not higher than 300° C. at 760 mmHg. Resins that can be employed as the above described thermoplastic resin having double bonds are exemplified by butadiene-styrene block copolymers, isoprene-styrene block copolymers, and their hydrogenated products.

EVOH is a material excellent in gas barrier properties, oil resistance and flavor retaining properties. However, it is difficult to use EVOH singly due to its drawbacks such as a great moisture permeability and high expense and EVOH is usually used in the form of a laminate structure with a thermoplastic resin such as polyolefin, polystyrene, polyester and polyamide. However, the adhesiveness between these thermoplastic resins and EVOH is poor. Even if EVOH is formed into a laminate structure using a conventional adhesive such as a polyolefin (e.g., polyethylene, polypropylene, and an ethylene-vinyl acetate copolymer) modified with maleic anhydride, ethylene-ethyl acrylate-maleic anhydride copolymer, delamination between layers may occur.

For solving this problem, Japanese Unexamined Patent Publication No. 7-329252 discloses a laminate structure having an EVOH layer and a thermoplastic resin layer laminated through a layer made of a thermoplastic resin containing a boron-containing group such as a boronic acid group. Examples of the thermoplastic resin having a boron-containing group to be used here include hydrogenated products of styrene-isoprene-styrene block copolymers. Further, Japanese Unexamined Patent Publication No.2001-164059 (European Patent No. 1090953) discloses, as an EVOH resin composition with excellent interlayer adhesion, an EVOH resin composition containing an alkali metal salt in an amount of from 50 to 500 ppm in terms of metal element.

However, in the method of addition to a terminal of a polymer, the amount of boronic acid groups to be introduced is limited. Therefore, an effect of introducing the functional groups may be exhibited insufficiently when this method is applied to polymers of high molecular weight. Further, also in the method of addition to an olefinic double bond, application of this method to ordinary styrene-hydrogenated diene block copolymers results in the same problem due to a very small amount of the remaining olefinic double bonds. There is an idea of employing a copolymer containing unhydrogenated diene blocks for avoidance of this problem. In such a case, however, a great amount of boronic acid groups are introduced to allow polymers to gelate and, as a result, the polymers will become unsuitable for use.

Use of a thermoplastic resin having a boronic acid group or the like as an adhesive requires somewhat high cost. An attempt, for cost reduction, to substitute a composition diluted with a thermoplastic resin having no such functional groups will result in insufficient interlayer adhesion between an EVOH layer and a thermoplastic resin layer. Further, in co-extrusion using a styrene-hydrogenated diene block copolymer containing a boronic acid group or the like as an adhesive layer together with other resins, it is difficult to extrude them with stability since the block copolymer is an elastic material. On the other hand, when EVOH contains an alkali metal salt, the thermal stability at high temperature of the EVOH is deteriorated and, therefore, problems such as defective appearance, e.g, coloring, fish eyes and streaks and odor caused by decomposed gas become prone to arise, for example, when such EVOH is formed into a film.

Thus, an object of the present invention is to obtain a highly reactive styrene-hydrogenated diene block copolymer with a sufficient amount of boron-containing groups introduced. Further, another object of the present invention is to provide a laminate that is excellent in gas barrier property and in thermal stability at high temperature and that causes no delamination between layers.

DISCLOSURE OF THE INVENTION

According to the present invention, it was found that the objects described above can be achieved by a styrene-hydrogenated diene block copolymer (A) containing in its side chain at least one functional group selected from the group consisting of a boronic acid group and boron-containing groups capable of being converted into a boronic acid group in the presence of water, wherein the amount of the functional group contained in the block copolymer (A) is 100 to 2000 µeq/g and the weight ratio of styrene units to hydrogenated diene units contained in the block copolymer (A), [(styrene unit)/(hydrogenated diene unit)], is 5/95 to 70/30.

In the styrene-hydrogenated diene block copolymer (A) of the present invention, the amount of olefinic double bonds contained in the copolymer is preferably 2000 µeq/g or less. The diene monomer that constitutes the hydrogenated diene block of the copolymer (A) is preferably butadiene and/or isoprene. Further, the functional group contained in the copolymer (A) is preferably a cyclic boronic ester group. Furthermore, the weight average molecular weight of the copolymer (A) is preferably from 1000 to 1000000.

The present invention encompasses a method for producing the above described styrene-hydrogenated diene block copolymer (A), the method comprising introducing at least one functional group selected from the group consisting of a boronic acid group and boron-containing groups capable of being converted into a boronic acid group in the presence of water, by addition reaction, to an olefinic double bond of a starting styrene-hydrogenated diene block copolymer. In the method, it is preferable that the ratio of hydrogenation of the diene block in the starting styrene-hydrogenated butadiene block copolymer is from 90 to 98 mol %. Further, a production method in which the starting styrene-hydrogenated diene block copolymer and a boron-containing compound having a boron-hydrogen bond are melt-kneaded in an extruder is also preferable.

The present invention also encompasses a thermoplastic resin composition (C) containing the above described styrene-hydrogenated diene block copolymer (A) and a thermoplastic resin (B) other than (A) in a weight ratio, [(A)/(B)], of 1/99 to 50/50. In this case, the thermoplastic resin (B) is preferably a polyolefin resin (B1). A suitable application of this thermoplastic resin composition (C) is adhesives.

It is also preferable that the thermoplastic resin composition (C) satisfies any one or both of the following formula (1) and the following formula (2):

$$|\alpha-\beta| \leq 0.25 \tag{1}$$

$$|\gamma-\delta| \leq 0.25 \tag{2}$$

where

α: the branching degree of the diene block in the block copolymer (A),

β: the branching degree of the polyolefin (B1),

γ: the content of hydrogen of methyl groups in diene block of the block copolymer (A), and δ: the content of hydrogen of methyl groups of the polyolefin (B1).

The present invention encompasses a multilayer structure comprising a layer of the above described styrene-hydrogenated diene block copolymer (A) and a layer of a thermoplastic resin (D) other than (A). The present invention also encompasses a multilayer structure comprising a layer of the above described thermoplastic resin composition (C) and a layer of a thermoplastic resin (D) other than (A). It is preferable that the thermoplastic resin (B) contained in the layer of the thermoplastic resin composition (C) is a polyolefin (B1) and the thermoplastic resin (D) constituting the layer of the thermoplastic resin (D) is a polyolefin (D1). Further, it is more preferable that the above described polyolefin (B1) and polyolefin (D1) are respectively a polyolefin containing as their constituents at least 50% by weight of the same kind of α-olefin.

A preferred embodiment of such multilayer structures is a multilayer structure obtained by laminating a layer of an ethylene-vinyl alcohol copolymer (E) and a layer of the above described thermoplastic resin (D) through a layer of the above described thermoplastic resin composition (C). In this embodiment, it is more preferable that the content of alkali metal salt in the ethylene-vinyl alcohol copolymer (E) is 100 ppm or less in terms of the weight of the metal element. Further, it is preferable that these multilayer structures are those obtained by co-extrusion or multilayer injection.

Figure 1:
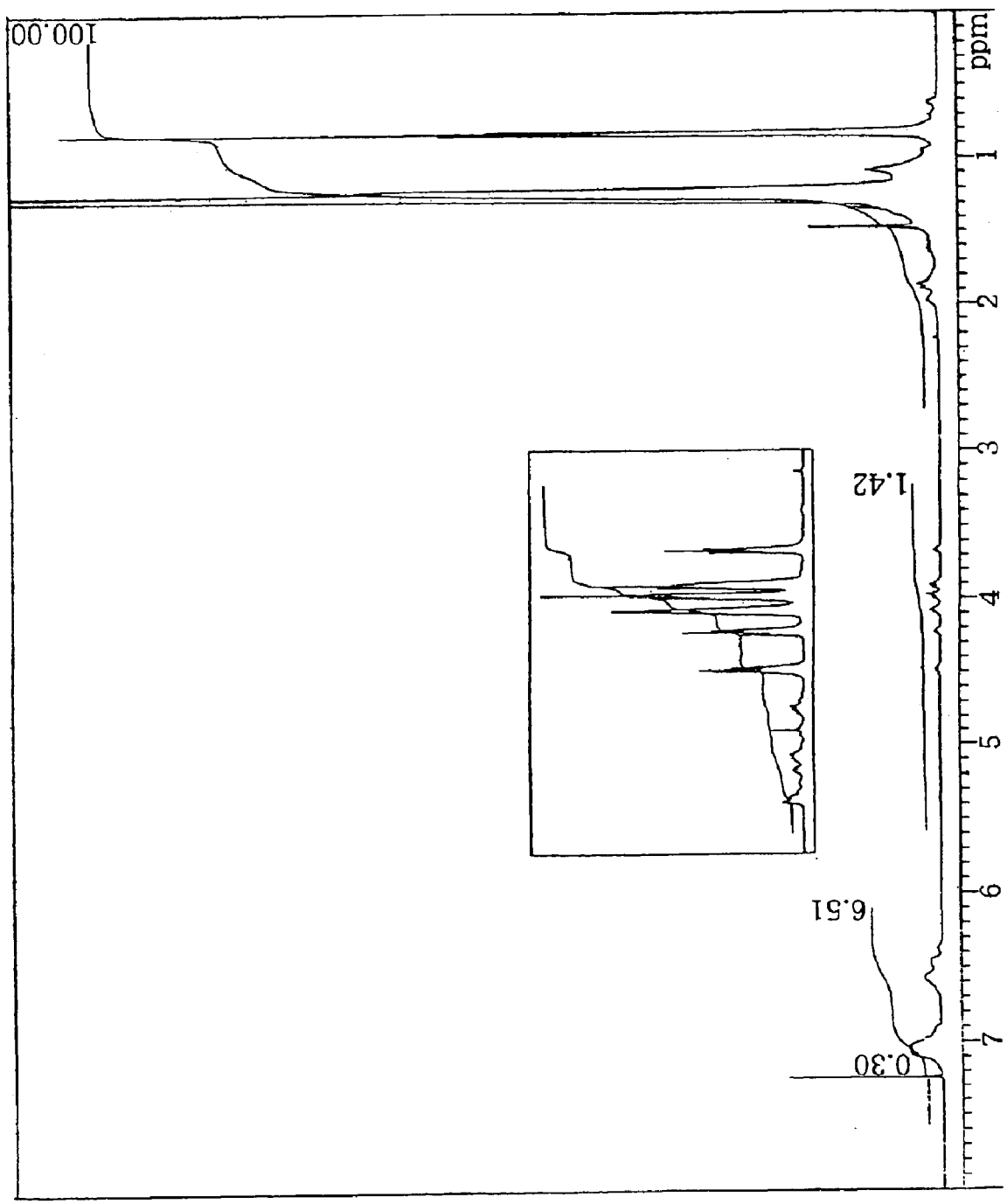
FIG. 1 shows the $^1$H-NMR chart of the styrene-hydrogenated butadiene-styrene block copolymer (SEBS) having a boron-containing group of Example 12.

The present invention will be described in detail below.

In the present invention, the styrene-hydrogenated diene block copolymer (A) is a block copolymer containing at least one styrene block and at least one hydrogenated diene block. Such a styrene-hydrogenated diene block copolymer includes diblock copolymers, triblock copolymers and multiblock copolymers containing four or more blocks. The bonding form of each block is not particularly limited. For example, when styrene blocks are represented by S1, S2, . . . , and hydrogenated diene blocks are represented by HD1, HD2, . . . , diblock copolymers include a block form of S1-HD1, triblock copolymers include block forms of S1-HD1-S2, HD1-S1-HD2 and S1-HD1-HD2, and multiblock copolymers include block forms of S1-HD1-S2-HD2 and S1-HD1-HD2-S2. The styrene blocks S1, S2, . . . may be the same or different. The hydrogenated diene blocks may also be the same or different. The hydrogenated diene block may be either a hydrogenated diene random copolymer block comprising at least two kinds of different diene monomers or a hydrogenated diene tapered copolymer block.

The styrene-hydrogenated diene copolymer (A) is preferably a triblock copolymer. The styrene-hydrogenated diene block copolymer (A) of the present invention is preferably employed as an adhesive independently or in the form of a resin composition (C) with a thermoplastic resin (B) other than (A). In particular, when it is employed as an interlayer adhesive resin disposed between a layer of EVOH (E) and a layer of polyolefin (D1), it exhibits an excellent performance. When a triblock copolymer is used as the styrene-hydrogenated diene block copolymer (A), since the styrene blocks of both terminals are incompatible with polyolefin, the migration of the styrene-hydrogenated diene block copolymer (A) to the layer of polyolefin (D1) is inhibited considerably effectively.

The multilayer structure comprising the EVOH (E) layer and the polyolefin (D1) layer is especially preferably employed as a container for packing foods. Therefore, use of a triblock copolymer as the styrene-hydrogenated diene block copolymer (A) can decrease the amount of the block copolymer (A) which migrates from an adhesive resin layer to foods, thereby improving the hygiene of the content.

The weight ratio of the styrene units to the hydrogenated diene units contained in the styrene-hydrogenated diene block copolymer (A) of the present invention, [(styrene units)/(hydrogenated diene units)], is required to be from 5/95 to 70/30. An amount of the styrene units less than that range is unfavorable from economic and hygienic standpoints since it will make a polymer difficult to precipitate during the production thereof, causing the necessity of use of additives for controlling the precipitation such as a surfactant. The weight ratio is preferably not less than 10/90, more preferably not less than 15/85. On the other hand, if the amount of the styrene units exceeds that range, one of the important features of the styrene-hydrogenated diene block copolymer (A), that is, the compatibility with polyolefin is deteriorated. Therefore, the weight ratio is preferably not more than 50/50, more preferably not more than 40/60, and still more preferably not more than 30/70.

The amount of the olefinic double bonds contained in the styrene-hydrogenated diene block copolymer (A) of the present invention is preferably not more than 0.002 equivalent per gram of the copolymer, that is, not more than 2000 μeq/g, more preferably not more than 1500 μeq/g. If the amount of the olefinic double bonds exceeds 2000 μeq/g, the thermal stability of the copolymer will be deteriorated.

The styrene-hydrogenated diene block copolymer can be produced by a known method, which is exemplified by, but is not limited thereto, a method comprising performing living anion polymerization in a solvent such as a saturated hydrocarbon using alkyllithium as an initiator to obtain a styrene-diene block copolymer and subsequently hydrogenating olefinic double bonds with a homogeneous or heterogeneous hydrogenation catalyst. In the production, components other than styrene and diene may be copolymerized unless the action and effect of the present invention are affected.

The diene monomer for constituting the styrene-hydrogenated diene block copolymer (A) of the present invention is not particularly restricted as long as it is capable of being block copolymerized with styrene. Examples thereof include conjugated dienes such as butadiene, isoprene and 1,3-pentadiene. Of them, butadiene and isoprene are preferred in view of cost and productivity. When the diene monomer is butadiene, the 1,2/1,4 bond ratio in the butadiene units preferably falls within the range of from 20/80 to 100/0.

Examples of the styrene-hydrogenated diene block copolymer (A) of the present invention include styrene-hydrogenated isoprene block copolymers, styrene-hydrogenated butadiene block copolymers, styrene-hydrogenated isoprene-styrene block copolymers, styrene-hydrogenated butadiene-styrene block copolymers, and styrene-hydrogenated (butadiene-isoprene random copolymer)-styrene block copolymers.

The styrene-hydrogenated diene block copolymer (A) of the present invention is characterized by containing in its side chain at least one functional group (hereinafter, referred to as boron-containing functional group) selected from the group consisting of a boronic acid group and boron-containing groups capable of being converted into a boronic acid group in the presence of water. Of the boron-containing functional groups, a boronic acid group is a group represented by the following formula (I).

The boron-containing group capable of being converted into a boronic acid group in the presence of water indicates a boron-containing group that can be hydrolyzed in the presence of water to be converted into a boronic acid group represented by the above formula (I). More specifically, the boron-containing group capable of being converted into a boronic acid group in the presence of water means a functional group that can be converted into a boronic acid group when being hydrolyzed under conditions of from room temperature to 150° C. for from 10 minutes to 2 hours by use, as a solvent, of water only, a mixture of water and an organic solvent (e.g., toluene, xylene and acetone), a mixture of a 5% aqueous boric acid solution and the above described organic solvent, or the like. Representative examples of such functional groups include boronic ester groups represented by the following general formula (II), boronic anhydride groups represented by the following general formula (III), and boronic acid salt groups represented by the following general formula (IV):

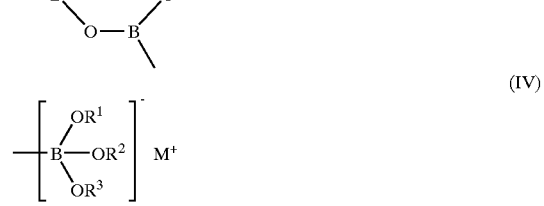

{wherein X and Y each represent a hydrogen atom, an aliphatic hydrocarbon group (e.g., a linear or branched alkyl or alkenyl group having from 1 to 20 carbon atoms), an alicyclic hydrocarbon group (e.g., a cycloalkyl group and a cycloalkenyl group), or an aromatic hydrocarbon group (e.g., a phenyl group and a biphenyl group); X and Y may be the same or different; however the case where both X and Y are hydrogen atoms is excluded, and X and Y may be bonded to each other; $R^1$, $R^2$ and $R^3$ each represent a hydrogen atom, an aliphatic hydrocarbon group, an alicyclic hydrocarbon group or an aromatic hydrocarbon group, like X and Y, and $R^1$, $R^2$ and $R^3$ may be the same or different; M represents an alkali metal; and the groups X, Y, $R^1$, $R^2$ and $R^3$ may have any other groups such as a hydroxyl group, a carboxyl group, a halogen atom, etc.}

Specific examples of the boronic ester group represented by general formula (II) include a dimethyl boronate group, a diethyl boronate group, a dibutyl boronate group, a dicyclohexyl boronate group, an ethylene glycol boronate group, a propylene glycol boronate group, a 1,3-propanediol boronate group, a 1,3-butanediol boronate group, a neopentyl glycol boronate group, a catechol boronate group, a glycerin boronate group, a trimethylolethane boronate group, a trimethylolpropane boronate group, a diethanolamine boronate group, etc.

Examples of the boronic acid salt group represented by formula (IV) include boronic acid alkali metal salt groups, and more specifically a sodium boronate group, a potassium boronate group, etc.

Of such boron-containing functional groups, cyclic boronate ester groups are preferred in view of thermal stability. Examples of the cyclic boronate ester groups include 5- or 6-membered cyclic boronate ester groups, and more specifically an ethylene glycol boronate group, a propylene glycol boronate group, a 1,3-propanediol boronate group, a 1,3-butanediol boronate group, a glycerin boronate group, etc.

The styrene-hydrogenated diene block copolymer (A) of the present invention may contain only one kind of or two or more kinds of boron-containing functional groups. The amount of the boron-containing functional groups contained in the block copolymer (A) must be from 0.0001 to 0.002 equivalents per gram of the copolymer, that is, from 100 to 2000 μeq/g, and preferably from 150 to 1500 μeq/g. If the amount of the functional groups is less than 100 μeq/g, the reactivity of the block copolymer (A) becomes insufficient. If the amount of the functional groups exceeds 2000 μeq/g, gelation becomes easy to occur.

The boron-containing functional group contained in the styrene-hydrogenated diene block copolymer (A) of the present invention must be contained as a side chain of the copolymer. This does not exclude the case where the copolymer contains the functional groups in both a side chain and a terminal thereof If the functional groups are bonded only to terminals of block copolymers, the amount of the functional groups becomes relatively low particularly for copolymers of high molecular weight, and the reactivity of the block copolymers becomes insufficient.

The weight average molecular weight of the styrene-hydrogenated diene block copolymer (A) of the present invention is preferably from 1000 to 1000000, more preferably from 10000 to 500000. If the weight average molecular weight is less than 1000, a polymer may become difficult to precipitate during its production. If the weight average molecular weight exceeds 1000000, the load may increase to make a polymer be difficult to mold. The weight average molecular weight is a value, in terms of polystyrene, obtained by GPC (Gel Permeation Chromatography) measurement using tetrahydrofuran or the like as a solvent. The styrene-hydrogenated diene block copolymer (A) of the present invention preferably has a melt flow rate of from 0.1 to 300 g/10 min measured at 230° C. under a load of 2160 g.

Next, description will be given of a representative process for producing the styrene-hydrogenated diene block copolymer (A) of the present invention which contains a boron-containing functional group in a side chain thereof.

First process: The styrene-hydrogenated diene block copolymer (A) containing a boron-containing functional group in a side chain thereof is obtained by allowing a boron compound having a boron-hydrogen bond typified by borane complexes and a boric acid ester typified by trialkyl borate to react under a nitrogen atmosphere with a styrene-hydrogenated diene block copolymer containing an olefinic double bond in a main chain and/or a side chain thereof to obtain a styrene-hydrogenated diene block copolymer containing a dialkyl boronate group, and, as needed, further allowing water or an alcohol to react. In this way, a boron-containing functional group is introduced to the olefinic double bond of the copolymer by addition reaction. In this case, if an olefinic double bond is also present at a terminal, a boron-containing functional group is introduced also to the terminal.

The ratio of hydrogenation of the diene block in the starting styrene-hydrogenated diene block copolymer is preferably from 90 to 98 mol %, more preferably from 92 to 97 mol %. Use of a starting material with a predetermined ratio of hydrogenation makes it easy to control the amount of the boron-containing functional groups to be introduced. It will also make possible to control the amount of the olefinic double bonds remaining after the introduction of the functional groups. If the ratio of hydrogenation of the diene block is less than 90 mol %, the copolymer may be deteriorated from heat or crosslinked during a reaction. If that ratio exceeds 98 mol %, the copolymer finally obtained may contain insufficient amount of boron-containing functional groups.

Preferred examples of the borane complex are a borane-tetrahydrofuran complex, a borane-dimethylsulfide complex, a borane-pyridine complex, a borane-trimethylamine complex, a borane-triethylamine complex, etc. Of these, more preferred are the borane-dimethylsulfide complex, the borane-trimethylamine complex and the borane-triethylamine complex. The amount of a borane complex to be applied preferably falls within the range of from 1/3 to 10 equivalents to the olefinic double bonds of the styrene-hydrogenated diene block copolymer.

Preferred examples of the trialkyl borates are lower alkyl esters of boric acid such as trimethyl borate, triethyl borate, tripropyl borate and tributyl borate. The amount of a trialkyl borate to be applied preferably falls within the range of from 1 to 100 equivalents to the olefinic double bonds of the styrene-hydrogenated diene block copolymer. The solvent is not necessarily used for the reaction, but it is, when used, preferably a saturated hydrocarbon solvent such as hexane, heptane, octane, decane, dodecane, cyclohexane, ethylcyclohexane, decalin, etc.

The reaction between a styrene-hydrogenated diene block copolymer having an olefinic double bond in its main chain and/or a side chain thereof and a borane complex and a trialkyl borate is recommended to be performed at a temperature falling within the range of from room temperature to 300° C., more preferably from 100 to 250° C., for a period of time of from 1 minute to 10 hours, more preferably from 5 minutes to 5 hours.

The dialkyl boronate group introduced to a styrene-hydrogenated diene block copolymer through the above described reaction can be hydrolyzed to a boronic acid group by a known method. It is also allowed to undergo transesterification with an alcohol by a known method to form a boronate group. Further, it can be allowed to undergo dehydration condensation by heating to form a boronic anhydride group. Furthermore, it can be allowed to react with a metal hydroxide or a metal alcoholate to form a boronic acid salt group.

Such conversion of a boron-containing functional group is preferably performed in an extruder as described later, though it can be performed using an organic solvent such as toluene, xylene, acetone and ethyl acetate. Examples of the alcohols include: monoalcohols such as methanol, ethanol and butanol; and polyhydric alcohols such as ethylene glycol, propylene glycol, 1,3-propanediol, 1,3-butanediol, neopentyl glycol, glycerin, trimethylolmethane, pentaerythritol and dipentaerythritol. Examples of the metal hydroxide include hydroxides of alkali metals such as sodium and potassium. Examples of the metal alcoholate include those made of the above described alcohols and the above described metals. These are not limited to those listed as examples. The amounts of these reagents to be used are usually from 1 to 100 equivalents to the dialkyl boronate groups.

The production of the styrene-hydrogenated diene block copolymer (A) of the present invention is preferably performed by a method comprising melt-kneading a starting styrene-hydrogenated diene block copolymer and a boron compound having a boron-hydrogen bond in an extruder.

The extruder to be used is not particularly limited. Although any of single-screw extruders, twin screw co-rotating extruders, twin screw counter-rotating extruders can be employed, preferred are the twin screw co-rotating extruders or the twin-screw counter-rotating extruders. It is preferred to form a vent near a resin outlet of an extruder. This allows the excess boron compound to be removed or recovered. One extruder with multi-vent may be used or two or more extruders may also be employed. When one extruder is used, preferred is a multistage extruder having, from its upper stream, 1) an opening for feeding a starting resin, styrene-hydrogenated diene block copolymer, 2) an opening for adding a boron compound having a boron-hydrogen bond and a boric acid ester, 3) a vent opening, 4) an opening for adding alcohols, and 5) a vent opening. With respect to the shape of screws, an extruder preferably has seals or reciprocal spiral screws between the above described 2), 3), 4) and 5). When two extruders are used, a first extruder preferably has, from its upperstream, 1) an opening for feeding a starting resin, 2) an opening for adding a boron compound having a boron-hydrogen bond and a boric acid ester and 3) a vent opening. A second extruder preferably has, from its upperstream, 1) a feed opening for feeding the resin obtained in the first extruder, 2) an opening for adding an alcohol, and 3) a vent opening. With respect to the shape of the screws of the extruders, the extruders preferably have seals or reciprocal spiral screws between the above described 2) and 3).

Since the boron compound having a boron-hydrogen bond to be used is decomposed by oxygen or water or oxygen in the air at high temperature, the concentrations of oxygen and steam in the extruder are preferably as low as possible. Therefore, it is preferable to supply a nitrogen gas to a feeder of an extruder or provide an extruder with a vent opening for degassing. The maximum temperature in the extruder depends on the starting resin, styrene-hydrogenated diene block copolymer and the boron compound, but it preferably falls within the range of from the melting point of the starting resin to 350° C., preferably from the melting point of the starting resin +10° C. to 300° C.

Preferred is a method comprising allowing a starting styrene-hydrogenated diene block copolymer and a boron compound having a boron-hydrogen bond to react, subsequently removing the unreacted boron compound particularly under reduced pressure, and then adding alcohols. In the method, it is preferable to remove the unreacted boron compound to 500 ppm or less, more preferably to 100 ppm or less in terms of the amount of boron. With regard to the pressure reduced, the degree of vacuum inside the system is not higher than 300 mmHg, preferably not higher than 50 mmHg. Addition of alcohols allows impurities to be removed more efficiently. At the same time, it is also possible to change, through transesterification, the kind of the ester of a boronic acid group introduced through a reaction to an ester of the alcohols added. It is preferable to remove the unreacted boron compound by further reducing the pressure after the addition of the alcohols. This removal makes the amount of boron compounds as impurities to be preferably not more than 100 ppm, and more preferably not more than 20 ppm.

The method for adding the boron compound having a boron-hydrogen bond is usually exemplified by a method comprising pouring the compound at the middle of a barrel of an extruder with a pump, a method comprising dry-blending the compound with a starting resin in advance, or a method comprising a combination of the above described method in which the compound is poured at the middle and the method in which the compound is dry-blended in advance. The amount of the boron compound to be added is not particularly limited, but preferably falls within the range of from 0.001 to 10% by weight, more preferably with in the range of from 0.01 to 5% by weight based on the weight of the starting resin, styrene-hydrogenated diene block copolymer. The preferable range of the amount of boronic acid ester to be added is preferably a range of from 0.01 to 100% by weight, more preferably a range of from 0.05 to 10% by weight based on the starting resin. The amount of the alcohol to be added is not particularly limited, but preferably falls within the range of from 0.1 to 100% by weight, more preferably within the range of from 0.5 to 20% by weight.

Second method: The styrene-hydrogenated diene block copolymer (A) having a boron-containing functional group in a side chain thereof is obtained by subjecting a known styrene-hydrogenated diene block copolymer having a carboxyl group in a side chain thereof and an amino group-containing boronic acid or an amino group-containing boronic acid ester such as m-aminophenylbenzene boronic acid and m-aminophenylboronic acid ethylene glycol ester to an amidation reaction using a known method. At this time, a condensing agent such as carbodiimide may be employed. The boron-containing functional group introduced to the styrene-hydrogenated diene block copolymer in such a way can be converted into another boron-containing functional group by the above described method.

The thus obtained styrene-hydrogenated diene block copolymer (A) of the present invention which contains a boron-containing functional group in a side chain thereof can be used singly or in combination with other thermoplastic resins as a compatibility modifier or an adhesion modifier.

In a thermoplastic resin composition (C) comprising the styrene-hydrogenated diene block copolymer (A) of the present invention which contains a boron-containing functional group in a side chain thereof and a thermoplastic resin (B) other than (A), the weight ratio of the styrene-hydrogenated diene block copolymer (A) to the thermoplastic resin (B) other than (A), [(A)/(B)], is preferably from 1/99 to 50/50. By setting the weight ratio [(A)/(B)] to be 1/99 or more, an effect of improving the material properties of a resin due to the addition of the styrene-hydrogenated diene block copolymer (A) can be obtained. If the weight ratio is not more than that value, for example, when the resin composition (C) is used as an adhesive, a sufficient adhesiveness may not be obtained. The weight ratio [(A)/(B)] is more preferably 2/98 or more, still more preferably 3/97 or more. On the other hand, by setting the weight ratio [(A)/(B)] to be 50/50 or less, a resin composition (C) having good extrusion stability can be obtained and the appearance of a molded article comprising the resin composition (C) is improved. If the weight ratio is not less than that value, the elastic modulus of the resin composition becomes too low and, as a result, the resin composition may become difficult to be extrusion formed uniformly. Further, by setting the weight ratio [(A)/(B)] to be 50/50 or less, it is possible, in a multilayer structure comprising the resin composition (C) and a polyolefin, to inhibit the migration of the styrene-hydrogenated diene block copolymer (A) to a layer of the polyolefin. The weight ratio [(A)/(B)] is more preferably not more than 40/60, still more preferably not more than 30/70, and most preferably not more than 40/60.

Examples of the thermoplastic resin (B) other than the styrene-hydrogenated diene block copolymer (A), which is blended with (A), include polyolefins (B1) such as polyethylenes (very low density, low density, middle density, high density), ethylene-vinyl acetate copolymers, ethylene-acrylic acid ester copolymers, polypropylenes, ethylene-propylene copolymers; the above described polyolefins graft-modified with maleic anhydride, glycidyl methacrylate or the like; semiaromatic polyesters such as polyethylene terephthalate and polybutylene terephthalate; aliphatic polyesters such as polyvalerolactone, polycaprolactone, polyethylene succinate and polybutylene succinate; aliphatic polyamides such as polycaprolactam, polylaurolactam, polyhexamethylene adipamide and polyhexamethylene azelamide; polyethers such as polyethylene glycol and polyphenylene ether. Of these, preferred are polyolefins (B1), which are of good compatibility.

When the thermoplastic resin other than (A) is a polyolefin (B1), the styrene-hydrogenated diene block copolymer (A) of the present invention which contains a boron-containing functional group in a side chain thereof preferably contains a monomer that constitutes the polyolefin (B1) as a constituent. For example, when the thermoplastic resin (B) is polyethylene, preferred as the styrene-hydrogenated diene block copolymer (A) are styrene-hydrogenated butadiene block copolymers and styrene-hydrogenated butadiene-styrene block copolymers. When the thermoplastic resin (B) is polypropylene, preferred as the styrene-hydrogenated diene block copolymer (A) are styrene-hydrogenated isoprene block copolymers and styrene-hydrogenated isoprene-styrene block copolymers.

When the resin composition (C) of the present invention is comprised of a styrene-hydrogenated diene block copolymer (A) and a polyolefin (B1), the following formula (1) is preferably satisfied:

$$|\alpha-\beta| \leq 0.25 \tag{1}$$

where $\alpha$ is the branching degree of the diene block in the block copolymer (A) and $\beta$ is the branching degree of the polyolefin (B1).

The branching degree means a ratio of the carbon atoms having a branch of a carbon-carbon bond to the whole carbon atoms constituting the main chain. In the case of the block copolymer (A), calculated is the branching degree of only the main chain of its diene block (not of its styrene block). The carbon atom having a branch of a carbon-carbon bond means a carbon atom to which an alkyl group bonds. For example, for an ideal polypropylene, its branching degree, which is the ratio of the carbon atoms having a branch (a methyl group in this case) to the whole carbon atoms in the main chain, is 0.5 since the same numbers of $CH_2$ carbons and $CH(CH_3)$ carbons are linked. For an ideal linear polyethylene, its branching degree is zero since the main chain comprises continuous bodies made of continuing $CH_2$ carbons and contains no branches. Branches of bonds other than carbon-carbon bonds, for example, branches of carbon-boron bonds are excluded from the branches defined here. Accordingly, even if a boron compound is added to a double bond in the main chain of a hydrogenated diene block to form a carbon-boron bond, the branching degree of the hydrogenated diene block does not change. Further, the branching degree does not change before and after the hydrogenation operation.

If $|\alpha-\beta|$ is 0.25 or less wherein the $|\alpha-\beta|$ is the absolute value of the difference between the branching degree a of the diene block in the block copolymer (A) and the branching degree, $\beta$, of the polyolefin (B1) which is compounded thereto, a particularly excellent adhesiveness can be exhibited when the resin composition (C) is used as an adhesive. $|\alpha-\beta|$ is more preferably 0.2 or less.

The above described branching degree can be determined by, for example, structural analysis using NMR. More specifically, it can be determined by measuring the peak area in a chart of $^1$H-NMR or $^{13}$C-NMR. Which of $^1$H-NMR and $^{13}$C-NMR is used in the determination depends on the resin as the objective of the determination and preferable one is selected. As described above, the branching degrees do not change before and after the hydrogenation operation or the addition reaction of boron compounds to double bonds. Therefore, it is also possible that a starting material, unhydrogenated styrene-diene block copolymer is determined for the branching degree and the value obtained is let be the branching degree α of the styrene-hydrogenated diene block copolymer (A) having a boron-containing functional group in a side chain thereof.

When the resin composition (C) of the present invention is comprised of a styrene-hydrogenated diene block copolymer (A) and a polyolefin (B1), it is also preferable that the following formula (2) is satisfied:

$$|\gamma - \delta| \leq 0.25 \quad (2)$$

where γ is the content of hydrogen of methyl groups in diene block of the block copolymer (A) and δ is the content of hydrogen of methyl groups of the polyolefin (B1).

The content of hydrogen of methyl groups means the ratio of hydrogen of methyl groups to the whole hydrogen atoms. In the case of the block copolymer (A), the hydrogen atoms contained only in the diene blocks (not in the styrene blocks) are defined as the whole hydrogen atoms and the content of hydrogen of methyl groups is determined. For example, since an ideal polypropylene contains the same numbers of $CH_3$ groups, CH groups and $CH_2$ groups, it has a content of hydrogen of methyl groups of 0.5. For an ideal linear polyethylene, its main chain is made of continuous bodies of $CH_2$ carbons. It therefore has a content of hydrogen of methyl groups of almost zero. For instance, when boron compounds are added to double bonds in main chains of hydrogenated diene blocks, the content of hydrogen of methyl groups is changed due to hydrogens introduced by the addition.

When the absolute value $|\gamma - \delta|$ of the difference between the content γ of hydrogen of methyl groups in diene block of the block copolymer (A) and the content δ of hydrogen of methyl groups of the polyolefin (B1) is 0.25 or less, excellent adhesiveness can be exhibited when the resin composition (C) is used as an adhesive resin. $|\gamma - \delta|$ is more preferably 0.2 or less.

The content of hydrogen of methyl groups can be calculated by dividing the peak area of hydrogen atoms of methyl groups by the peak area of the whole hydrogen atoms in a $^1$H-NMR chart measured. Since a methyl group is often formed simultaneously with the formation of a branch, the content of hydrogen of methyl groups is a parameter correlated with the above described branching degree to some extent. In the case of resins modified with a boron compound like the block copolymer (A) of the present invention, it may be difficult to measure the above described branching degree due to the influence of hydrogen atoms or carbon atoms of boron-containing groups. Even in such cases, whether a combination is proper or not can be judged by use of the content of hydrogen of methyl groups as a parameter correlated with branching degrees.

The method for producing the thermoplastic resin composition (C) of the present invention is not particularly restricted. For example, it can be produced by melt-kneading a styrene-hydrogenated diene block copolymer (A) having a boron-containing functional group in a side chain thereof and a thermoplastic resin (B) other than (A) by a known method using a Banbury mixer, a twin-screw extruder or the like. The thus obtained thermoplastic resin composition (C) of the present invention can be used as a compatibility modifier or an adhesion modifier as described previously.

The styrene-hydrogenated diene block copolymer (A) of the present invention is preferably used in the form of a multilayer structure comprising a layer of the block copolymer (A) and a layer of a thermoplastic resin (D) other than (A). In another preferable embodiment, the styrene-hydrogenated diene block copolymer (A) of the present invention is employed in the form of a multilayer structure comprising a layer of a resin composition (C) comprising the block copolymer (A) and a thermoplastic resin (B) other than (A) and a layer of a thermoplastic resin (D) other than (A).

The thermoplastic resin (D) to be laminated is not particularly restricted and examples thereof include resins such as polyolefins (D1) such as polyethylenes (very low density, low density, middle density, high density), ethylene-vinyl acetate copolymers, ethylene-acrylic acid ester copolymers, polypropylenes, ethylene-propylene copolymers; the above described polyolefins graft-modified with maleic anhydride, glycidyl methacrylate or the like; semiaromatic polyesters such as polyethylene terephthalate and polybutylene terephthalate; aliphatic polyesters such as polyvalerolactone, polycaprolactone, polyethylene succinate and polybutylene succinate; aliphatic polyamides such as polycaprolactam, polylaurolactam, polyhexamethylene adipamide and polyhexamethylene azelamide; polyethers such as polyethylene glycol and polyphenylene ether; polycarbonate; styrene-based polymers such as polystyrene and styrene-acrylonitrile-butadiene copolymers; polymethyl methacrylate; and polymers of vinyl halide such as polyvinyl chloride and vinylidene fluoride. Of these, preferred are polyolefins (D1). In the layer of the thermoplastic resin (D), scraps of the laminate of the present invention may be blended unless the objective of the present invention is damaged.

When a multilayer structure in which a layer of a resin composition (C) comprising a styrene-hydrogenated diene block copolymer (A) and a thermoplastic resin (B) is laminated to a layer of a thermoplastic resin (D) is produced, it is preferable that the thermoplastic resin (B) contained in the layer of the resin composition (C) is a polyolefin (B1) and the thermoplastic resin (D) constituting the layer of the thermoplastic resin (D) is a polyolefin (D1). In this situation, it is more preferable that both the polyolefin (B1) and the polyolefin (D1) are polyolefins containing as their constituents at least 50% by weight of the same kind of α-olefin. For example, it is preferable to use resins each mainly comprising ethylene or resins each mainly comprising propylene, in combination, as the polyolefin (B1) and the polyolefin (D1). This will result in a good interlayer adhesion between the layer of the resin composition (C) and the layer of the polyolefin (D1). It is particularly preferable that the polyolefin (B1) and the polyolefin (D1) are the same type of resins.

The styrene-hydrogenated diene block copolymer (A) of the present invention is preferably employed as an adhesive. In a more preferable embodiment, a resin composition (C) characterized by containing the styrene-hydrogenated diene block copolymer (A) and a thermoplastic resin (B) other than (A) in a weight ratio [(A)/(B)] of from 1/99 to 50/50 is used as an adhesive. In a particularly preferable embodiment, the resin composition (C) is used as an adhesive for bonding a thermoplastic resin (D) and EVOH (E). A multilayer structure in which a layer of the EVOH (E) and a layer of the thermoplastic resin (D) are laminated through a layer of the resin composition (C) is a preferable embodiment.

When a multilayer structure in which a layer of the EVOH (E) and a layer of the thermoplastic resin (D) are laminated is formed by co-extrusion using the styrene-hydrogenated diene block copolymer (A) as an adhesive, a high interlayer adhesion strength is achieved immediately after the co-extrusion. On the other hand, with regard to the adhesion power of widely-used adhesive resins such as maleic anhydride-modified polyolefin, the adhesion strength often increases slowly after the completion of co-extrusion and is stabilized in about one week. Therefore, in many cases, quality control is performed based on an adhesion strength that will be achieved after one week predicted from the adhesion strength achieved immediately after co-extrusion. However, an unexpectedly small increase in adhesion strength may result in the occurrence of peeling after packing of commercial items. For many multilayer structures containing an EVOH layer, it requires approximately 1 week to 1 month from when it was formed to when foods or the like are actually packed therein. It, therefore, is important that the adhesion strength at the time of packing can be predicted accurately. The use of the styrene-hydrogenated diene block copolymer (A) of the present invention as an adhesive can provide a multilayer structure that will cause little variation in adhesion strength after a long period of time and that can be used immediately after the formation thereof.

The EVOH (E) used in the present invention preferably has an ethylene content within the range of from 3 to 70 mol %, more preferably from 5 to 60 mol %, but the ethylene content is not limited to those ranges. The saponification degree is usually from 10 to 100 mol %, preferably from 50 to 100 mol %, still more preferably from 80 to 100 mol %, still more preferably from 95 to 100 mol %, and most preferably from 99 to 100 mol %. If the saponification degree is low, the degree of crystallinity of EVOH may become insufficient or the thermal stability during melt-forming may become insufficient.

EVOH can be produced by a known process comprising copolymerizing ethylene and vinyl ester using a radical initiator and then saponifying in the presence of an alkaline catalyst. Examples of the vinyl ester include vinyl acetate, vinyl propionate, vinyl pivalate, vinyl caprate and vinyl benzoate. Of these vinyl esters, only one of them may be used or at least two of them may be used in combination. Of these, vinyl acetate is preferred.

Unless the object of the present invention is disturbed, copolymerization may be performed in the presence of other copolymerizable components. Examples of the other components include olefinic monomers such as propylene, 1-butene and isobutene; acrylamide type monomers such as acrylamide, N-methylacrylamide, N-ethylacrylamide and N,N-dimethylacrylamide; methacrylamide type monomers such as methacrylamide, N-methylmethacrylamide and N-ethylacrylamide, N,N-demethylmethacrylamide; vinyl ether type monomers such as methyl vinyl ether, ethyl vinyl ether, n-propyl vinyl ether, isopropyl vinyl ether, tert-butyl vinyl ether and dodecyl vinyl ether; allyl alcohol; vinyltrimethoxysilane; N-vinyl-2-pyrrolidone.

The thus obtained EVOH may be used alone or may be used in combination with an EVOH different in ethylene content, saponification degree, polymerization degree or the like. Further, unless the object of the present invention is disturbed, it may be used with addition of thermoplastic resins other than EVOH. The content of the thermoplastic resins in EVOH preferably falls within the range of from 0 to 50% by weight, more preferably within the range of from 0 to 40% by weight.

Examples of such thermoplastic resins include polyolefins such as polyethylenes (very low density, low density, middle density, high density), ethylene-vinyl acetate copolymers, ethylene-acrylic acid ester copolymers, polypropylenes, ethylene-propylene copolymers; the above described polyolefins graft-modified with maleic anhydride, glycidyl methacrylate or the like; semiaromatic polyesters such as polyethylene terephthalate and polybutylene terephthalate; aliphatic polyesters such as polyvalerolactone, polycaprolactone, polyethylene succinate and polybutylene succinate; aliphatic polyamides such as polycaprolactam, polylaurolactam, polyhexamethylene adipamide and polyhexamethylene azelamide; and polyethers such as polyethylene glycol and polyphenylene ether.

The melt flow rate (MFR) (a value measured at 190° C. under a load of 2160 g) of the EVOH (E) to be employed for the laminate of the present invention is preferably from 0.1 to 200 g/10 min, more preferably from 0.5 to 50 g/10 min. For those having a melting point near 190° C. or over 190° C., used is a value obtained by plotting a plurality of measurements obtained under the above described load at temperatures not lower than the melting point on a semi-logarithmic graph with inverses of absolute temperatures as abscissa against MFRs as ordinate (in a logarithmic scale) and extrapolating to 190° C.

An EVOH with a content of an alkali metal salt, in terms of metal elements, of not greater than 100 ppm is particularly preferable as the EVOH (E) to be used in the laminate of the present invention. The upper limit of the content of an alkali metal salt is more preferably 70 ppm or less, and most preferably 50 ppm or less. The lower limit of the content of an alkali metal salt is preferably not less than 3 mm, more preferably not less than 5 ppm, and still more preferably not less than 7 ppm. When an EVOH with a content of an alkali metal salt, in terms of metal elements, of not more than 100 ppm is used as the EVOH (E), the thermal stability of EVOH is improved. Further, defective appearance such as coloring, fish eyes and streaks is inhibited and multilayer structures to be obtained are improved in appearance properties.

Conventionally, various types of resins (e.g., maleic anhydride-modified polyolefins) have been developed as adhesive resins for EVOH. However, for all of them, an EVOH containing over 100 ppm, in terms of metal elements, of an alkali metal salt must be employed in order to obtain a practical adhesion strength. Therefore, in the production of multilayer structures (especially, co-extruded multilayer structures), it has been impossible to use any EVOH that contains less alkali metal salt and is excellent in thermal stability. However, a resin composition (C) comprising the styrene-hydrogenated diene block copolymer (A) of the present invention and a thermoplastic resin (B) other than (A) shows a considerably excellent adhesion strength to an EVOH with an alkali metal salt content, in terms of metal elements, of 100 ppm or less. Therefore, even if such an EVOH with an alkali metal salt content, in terms of metal elements, of 100 ppm or less is used in a multilayer laminate comprising a thermoplastic resin (D) and an EVOH (E), a multilayer structure with good adhesiveness can be provided by laminating the (D) and (E) through the resin composition (C). From this viewpoint, the present invention is significant.

The method for controlling the content of an alkali metal salt in EVOH (E) within the above described range is not particularly restricted, but a method comprising removing an alkali metal salt by washing an EVOH after saponification by a known method and then allowing the EVOH to contain a predetermined amount of an alkali metal salt is preferred since an EVOH after saponification usually contains an alkali metal salt as a residue of a saponification catalyst. Examples of the method for washing an EVOH after saponification include a method comprising putting an EVOH in the form of chips in a large amount of water and stirring it, a method comprising spraying water with a shower, and a method in which continuous washing is performed using a tower type washer. Examples of the method for allowing an EVOH to contain an alkali metal salt include a method comprising immersing an EVOH in a solution of an alkali metal salt, a method comprising melting an EVOH and mixing it with an alkali metal salt or its solution, and a method comprising dissolving an EVOH in a proper solvent and mixing it with an alkali metal salt.

In the case where an EVOH is immersed in a solution of an alkali metal salt, the concentration of the alkali metal salt in the solution is not particularly limited. The solvent of the solution is not particularly restricted, but is preferably an aqueous solution for reasons of handling. The weight of the solution in which an EVOH is immersed is at least three times, preferably at least twenty times the weight of dry EVOH. A preferable range of the immersion time depends on the form of EVOH. For chips of approximately from 1 to 10 mm, the immersion time is usually 1 hour or more, preferably 2 hours or more. The treatment of immersion in a solution is not particularly restricted. Immersion may be performed in a plurality of solutions separated or the treatment may be performed at a time. From the viewpoint of simplification of the process, the treatment is preferably performed at a time. When the treatment is performed by immersion into a solution as described above, an EVOH (E) can be obtained through further drying.

An EVOH (E) containing from 10 to 500 ppm of carboxylic acid is preferably used as the EVOH (E) to be used in the present invention. Use of an EVOH (E) containing a carboxylic acid in an amount within such a range improves the thermal stability of an EVOH (E) and the appearance property of a multilayer structure to be obtained. The carboxylic acid to be used in the present invention preferably has a pKa at 25° C. of not less than 3.5. When the pKa at 25° C. is lower than 3.5, it may become difficult to control the pH of EVOH (E) and the thermal stability of EVOH (E) may become poor.

Examples of the carboxylic acid to be used in the present invention include succinic acid, adipic acid, benzoic acid, capric acid, lauric acid, glycolic acid, lactic acid, formic acid, acetic acid and propionic acid. When a dicarboxylic acid such as succinic acid and adipic acid is used, gels or pimples may easily be formed during molding. Of these carboxylic acids, acetic acid, propionic acid and lactic acid are more preferable because of their cost benefits, appropriate acidity and ease to control the pH of EVOH (E). Acetic acid and propionic acid are particularly preferable.

If the content of the carboxylic acid exceeds 500 ppm, the thermal stability of EVOH becomes poor and formed articles obtained easily cause defective appearance, e.g., coloring, fish eyes and streaks. The upper limit of the content of the carboxylic acid is preferably not more than 400 ppm, more preferably not more than 300 ppm. On the other hand, the lower limit of the content of the carboxylic acid is preferably not less than 20 ppm, more preferably not less than 30 ppm.

From the viewpoint of improvement of the thermal stability of EVOH, it is also preferable to employ, as the EVOH (E) to be used in the present invention, an EVOH (E) containing a phosphoric acid compound in an amount of from 1 to 300 ppm in terms of phosphate radial. The upper limit of the content of the phosphoric acid compound is preferably not more than 250 ppm, more preferably not more than 200 ppm in terms of phosphate radical. The lower limit of the content of the phosphoric acid compound is preferably not less than 3 ppm, more preferably at least 5 ppm, and particularly preferably not less than 10 ppm.

The kind of the phosphoric acid compound to be compounded to EVOH is not particularly restricted. Various kinds of acids such as phosphoric acid, phosphorous acid, and their salts can be employed. Phosphoric acid salts may be contained in any form of primary phosphate, secondary phosphate and tertiary phosphate. The kind of their cations is also not particularly restricted, but preferred are alkali metal salts and alkaline earth metal salts. Of these, phosphoric acid compounds are preferably added in the form of phosphoric acid, sodium dihydrogenphosphate, potassium dihydrogenphosphate, disodium hydrogenphosphate and dipotassium hydrogenphosphate. The phosphoric acid compounds are more preferably added in the form of phosphoric acid, sodium dihydrogenphosphate and potassium dihydrogenphosphate.

Unless the object of the present invention is disturbed, an EVOH (E) containing a boron compound can be used as the EVOH (E). Examples of the boron compound include boric acids, boric acid ester, boric acid salt, boron hydride and the like. Specifically, examples of the boric acids include orthoboric acid, metaboric acid, tetraboric acid and the like. Examples of the boric acid ester include triethyl borate, trimethyl borate and the like. Examples of the boric acid salts include alkali metal salt and alkaline earth metal salt of the above described boric acids and borax. Of these compounds, preferred is orthoboric acid. When a boron compound is blended, the content of the boron compound in terms of boron element is preferably from 20 to 2000 ppm, more preferably from 50 to 1000 ppm.

As described above, it is possible to use, as the EVOH (E) used in the present invention, an EVOH (E) that, as required, contains at least one compound selected from the group consisting of carboxylic acids, phosphoric acid compounds and boron compounds. The method for preparing such an EVOH (E) is not particularly restricted and, for example, methods similar to those for compounding the above described alkali metal salt can be adopted.

Preferred examples of layer constitutions of multilayer structures in which the layer of a thermoplastic resin layer (D) and the layer of an EVOH (E) are disposed in layer through the layer of a resin composition (C) are as follows:

| Three layers: | D/C/E |
|---|---|
| Four layers: | D/C/E/D, D/Reg/C/E, C/D/C/E |
| Five layers: | D/C/E/C/D, D/C/E/C/Reg, D/C/E/AD/D, E/C/D/C/E, D/Reg/D/C/E |
| Six layers: | D/C/E/C/Reg/D |
| Seven layers: | D/C/E/Reg/C/Reg/D |

AD indicates herein a conventional interlayer adhesive such as maleic anhydride-modified polyolefin. Reg indicates a scrap layer in the multilayer structure of the present invention. When two or more D layers are employed in the multilayer structure, they may be the same or different. Like this, when two or more C layers or E layers are employed in the multilayer structure, these may be the same or different.

The thicknesses of the individual layers of the multilayer structure may optionally be selected. Such selection allows the total thickness of the multilayer structure to fall within a desired range. For obtaining a multilayer structure having a certain degree of thickness, it is preferable to make D layer thick in view of costs.

The method for producing the above described multilayer structure is not particularly restricted and known methods such as co-extrusion, multilayer injection, extrusion coating, dry lamination, solution coating, and the like can be adopted. Of these methods, preferred are co-extrusion and multilayer injection.

When co-extrusion is adopted, the melt-extruded components for individual layers may be allowed to contact with each other within a die to laminate (in-die lamination) or may be allowed to contact with each other outside of a die to laminate (out-die lamination). If the contact is performed under pressure, the adhesiveness between individual layers of the multilayer structure can be improved. The pressure preferably ranges from 1 to 500 Kg/cm$^2$.

When parts of complicated shapes are molded, adopted is multilayer injection molding, which is specifically exemplified by, but is not limited thereto, two color molding, insert injection molding, co-injection molding and the like. A molding method is suitably selected depending, for example, upon the shape of the molded article.

The thus obtained multilayer structure is excellent in interlayer adhesion as is clear from the examples described later and has the advantage of causing less appearance abnormalities such as disturbance in a surface, gels and pimples even when it is recovered and reused. The multilayer structure can be subjected to stretching such as uniaxial stretching, biaxial stretching or blow stretching, or thermoforming such as vacuum-air pressure forming to form a molded articles (e.g., films, sheet, bottles and cups) with excellent physical properties and gas barrier properties. The molded articles obtained are useful for applications where a gas barrier property is required such as materials for wrapping foods, materials for wrapping medical items (drugs and medical appliances) and fuel tanks.

BEST MODE FOR CARRYING OUT THE INVENTION

The present invention will be described in more detail below by way of Examples, which, however, do not limit thereto at all. In the following description, a ratio means a weight ratio and "%" means "% by weight" unless otherwise stated. Measurements were carried out in the following methods.

(1) The Amount of Functional Groups Contained in Copolymer (A)

The amounts of the double bonds and the functional groups in the styrene-hydrogenated diene block copolymer (A) were calculated from a spectrum obtained by $^1$H-NMR measurement using deuterated chloroform as a solvent. The amount of the double bonds in very low density polyethylene in Comparative Examples was calculated from a spectrum obtained by $^1$H-NMR measurement using deuterated para-xylene as a solvent. Further, the amount of the functional groups in very low density polyethylene was calculated from a spectrum obtained by $^1$H-NMR measurement using deuterated toluene as a solvent.

(2) Weight Average Molecular Weight

The weight average molecular weight of the styrene-hydrogenated diene block copolymer (A) is a value in terms of polystyrene which was obtained by GPC measurement using tetrahydrofuran as a solvent. The GPC measurement conditions are as follows:

Instrument: SYSTEM 11 (manufactured by Showa Denko)

Column: MIXED-C (two columns) (manufactured by Polymer Laboratory)

| Mobile phase: | Tetrahydrofuran |
|---|---|
| Rate of flow: | 1.0 mL/min |
| Temperature: | 40° C. |
| Concentration: | 0.1% |
| Injection amount: | 100 μL |
| Detector: | RI |
| Standard: | Polystyrene (manufactured by Polymer Laboratory) |
| Analysis software: | Millennium 32 (manufactured by Waters) |

(3) Branching Degree (α) of Diene Block of Block Copolymer (A)

A styrene-diene block copolymer before hydrogenation was subjected to $^1$H-NMR measurement according to the measurement conditions shown below to obtain a ratio of 1,4-adducts to 1,2-adducts and, from a structure assigned based on that ratio, the branching degree of the copolymer. The branching degree obtained in such a way is the same as the branching degree (α) of a styrene-hydrogenated diene block copolymer (A) modified after hydrogenation with a boron compound.

Instrument: A0201-Superconductive nuclear magnetic resonance spectrometer Lambda 500 manufactured by JEOL

| | |
|---|---|
| Resonance frequency: | 500 MHz |
| Pulse series: | Single pulse |
| Measurement solvent: | CDCl₃ |
| Measurement concentration: | 5% by weight |
| Measurement temperature: | 50° C. |
| Number of integration: | 64 |

(4) Branching Degree (β) of Polyolefin (B1)

The branching degree (β) of a polyolefin (B1) was determined by measurement of $^{13}$C-NMR according to the following conditions.

| | |
|---|---|
| Resonance frequency: | 125.65 MHz |
| Pulse series: | Decoupling with $^1$H-gate |
| Pulse width: | 45° Pulses |
| Pulse delay: | 1.03 sec. |
| Time for capturing data: | 0.97 sec. |
| Measurement temperature: | 120° C. |
| Measurement solvent: | Orthodichlorobenzene/Benzene – d6 = 4/1 (volume ratio) |
| Measurement concentration: | 10% by weight |
| Relaxation reagent: | Cr(acac)₃ (15 mg/mL) |

(5) Content (γ) of Hydrogen of Methyl Groups of Diene Block of Block Copolymer (A)

Using a block copolymer (A) as a sample, the ratio of the amount of hydrogen atoms of methyl groups to the amount of all hydrogen atoms was determined according to the following measurement conditions by performing $^1$H-NMR measurement. In the determination, calculation was carried out with all the hydrogen atoms of styrene blocks excluded.

| | |
|---|---|
| Instrument: | A0201-Superconductive nuclear magnetic resonance spectrometer Lambda 500 manufactured by JEOL |
| Resonance frequency: | 500 MHz |
| Pulse series: | Single pulse |
| Measurement solvent: | CDCl₃ |
| Measurement concentration: | 5% by weight |
| Measurement temperature: | 50° C. |
| Number of integration: | 64 |

(6) Content (δ) of Hydrogen of Methyl Groups of Polyolefin (B1)

Using a polyolefin (B1) as a sample, the ratio of the amount of hydrogen atoms of methyl groups to the amount of all hydrogen atoms was determined by performing $^1$H-NMR measurement according to the measurement conditions given in (5) above.

SYNTHESIS EXAMPLE 1 (USED IN EXAMPLES 1 AND 2)

In a 200 L pressure-resistant vessel filled with dry nitrogen, 75 kg of cyclohexane as a solvent and 45 g of sec-butyllithium as a polymerization initiator were added and, subsequently, 3.6 kg of styrene was added. After polymerization at 50° C., 0.21 kg of tetrahydrofuran as a Lewis base was added and, subsequently, 32.8 kg of butadiene and 3.6 kg of styrene were added in this order. When polymerization was carried out, a triblock copolymer of styrene-butadiene-styrene type was obtained. The block copolymer had a branching degree (α) of 0.154. The block copolymer obtained was subjected to hydrogenation at a hydrogen pressure of 2 MPa and a reaction temperature of 100° C. in cyclohexane using Pd/C (palladium/carbon) as a catalyst, yielding a styrene-hydrogenated butadiene-styrene block copolymer (SEBS). The resulting block copolymer had a weight average molecular weight of 100400, a styrene content of 18% by weight, and a ratio of hydrogenation of 97 mol %.

SYNTHESIS EXAMPLE 2 (USED IN EXAMPLES 3 AND 4)

In a 200 L pressure-resistant vessel filled with dry nitrogen, 75 kg of cyclohexane as a solvent and 45 g of sec-butyllithium as a polymerization initiator were added and, subsequently, 2.3 kg of styrene was added. After polymerization at 50° C., 0.21 kg of tetrahydrofuran as a Lewis base was added and, subsequently, 28.3 kg of butadiene and 2.3 kg of styrene were added in this order. When polymerization was carried out, a triblock copolymer of styrene-butadiene-styrene type was obtained. The block copolymer had a branching degree (α) of 0.095. The block copolymer obtained was subjected to hydrogenation at a hydrogen pressure of 2 MPa and a reaction temperature of 100° C. in cyclohexane using Pd/C as a catalyst, yielding a styrene-hydrogenated butadiene-styrene block copolymer (SEBS). The resulting block copolymer had a weight average molecular weight of 83000, a styrene content of 14% by weight, and a ratio of hydrogenation of 95 mol %.

SYNTHESIS EXAMPLE 3 (USED IN EXAMPLE 5)

In a 200 L pressure-resistant vessel filled with dry nitrogen, 75 kg of cyclohexane as a solvent and 21 g of sec-butyllithium as a polymerization initiator were added and, subsequently, 1.7 kg of styrene was added. After polymerization at 50° C., 0.59 kg of tetrahydrofuran as a Lewis base was added and, subsequently, 17.3 kg of isoprene and 1.7 kg of styrene were added in this order. When polymerization was carried out, a triblock copolymer of styrene-isoprene-styrene type was obtained. The block copolymer had a branching degree (α) of 0.335. The block copolymer obtained was subjected to hydrogenation at a hydrogen pressure of 2 MPa and a reaction temperature of 100° C. in cyclohexane using Pd/C as a catalyst, yielding a styrene-hydrogenated isoprene-styrene block copolymer (SEBS). The resulting block copolymer had a weight average molecular weight of 83000, a styrene content of 16% by weight, and a ratio of hydrogenation of 92 mol %.

SYNTHESIS EXAMPLE 4 (USED IN EXAMPLE 6)

In a 200 L pressure-resistant vessel filled with dry nitrogen, 75 kg of cyclohexane as a solvent and 45 g of sec-butyllithium as a polymerization initiator were added and, subsequently, 6.4 kg of styrene was added. After polymerization at 50° C., 0.21 kg of tetrahydrofuran as a Lewis base was added and, subsequently, 29.6 kg of butadiene and 6.4 kg of styrene were added in this order. When polymerization was carried out, a triblock copolymer of styrene-butadiene-styrene type was obtained. The block copolymer had a branching degree (α) of 0.154. The block copolymer obtained was subjected to hydrogenation at a hydrogen pressure of 2 MPa and a reaction temperature of 100° C. in cyclohexane using Pd/C as a catalyst. The reaction was carried out while sampling the reaction system at certain time intervals and the reaction was stopped in a stage where the ratio of hydrogenation of the hydrogenated block copolymer has become 90 mol %, yielding a styrene-hydrogenated butadiene-styrene block copolymer (SEBS). The resulting block copolymer had a weight average molecular weight of 100400 and a styrene content of 30% by weight.

SYNTHESIS EXAMPLE 5 (USED IN COMPARATIVE EXAMPLE 1)

In a 200 L pressure-resistant vessel filled with dry nitrogen, 75 kg of cyclohexane as a solvent and 45 g of sec-butyllithium as a polymerization initiator were added and, subsequently, 6.4 kg of styrene was added. After polymerization at 50° C., 0.21 kg of tetrahydrofuran as a Lewis base was added and, subsequently, 29.6 kg of butadiene and 6.4 kg of styrene were added in this order. When polymerization was carried out, a triblock copolymer of styrene-butadiene-styrene type was obtained. The block copolymer had a branching degree ($\alpha$) of 0.154. The block copolymer obtained was subjected to hydrogenation at a hydrogen pressure of 2 MPa and a reaction temperature of 100° C. in cyclohexane using Pd/C as a catalyst. The reaction was carried out while sampling the reaction system at certain time intervals and the reaction was stopped in a stage where the ratio of hydrogenation of the hydrogenated block copolymer has become 52 mol %, yielding a styrene-hydrogenated butadiene-styrene block copolymer (SEBS). The resulting block copolymer had a weight average molecular weight of 100400 and a styrene content of 30% by weight.

SYNTHESIS EXAMPLE 6 (USED IN COMPARATIVE EXAMPLE 2)

In a 200 L pressure-resistant vessel filled with dry nitrogen, 75 kg of cyclohexane as a solvent and 45 g of sec-butyllithium as a polymerization initiator were added and, subsequently, 6.4 kg of styrene was added. After polymerization at 50° C., 0.21 kg of tetrahydrofuran as a Lewis base was added and, subsequently, 29.6 kg of butadiene and 6.4 kg of styrene were added in this order. When polymerization was carried out, a triblock copolymer of styrene-butadiene-styrene type was obtained. The block copolymer had a branching degree ($\alpha$) of 0.154. The block copolymer obtained was subjected to hydrogenation at a hydrogen pressure of 2 MPa and a reaction temperature of 100° C. in cyclohexane using Pd/C as a catalyst. The reaction was carried out while sampling the reaction system at certain time intervals and the reaction was stopped in a stage where the ratio of hydrogenation of the hydrogenated block copolymer has become 99 mol %, yielding a styrene-hydrogenated butadiene-styrene block copolymer (SEBS). The resulting block copolymer had a weight average molecular weight of 100400 and a styrene content of 30% by weight.

EXAMPLE 1

The styrene-hydrogenated butadiene-styrene block copolymer (SEBS) prepared according to Synthesis Example 1 described above and having the constitution and physical properties shown in Table 1 was fed to a twin-screw extruder at a rate of 7 kg/hour while ventilating the feed port using 1 L/min nitrogen. Subsequently, while feeding a mixed solution of borane-triethylamine complex (TEAB) and boronic acid 1,3-butanediol ester (BBD) (TEAB/BBD= 29/71, weight ratio) from liquid feeder 1 at a rate of 0.6 kg/hour and 1,3-butanediol from liquid feeder 2 at a rate of 0.4 kg/hour, melt-kneading was carried out continuously. During the kneading, the pressure was regulated so that the gauges at vent 1 and vent 2 indicated about 20 mmHg. As the result, SEBS containing boronic acid 1,3-butanediol ester group was obtained from the discharge port at a rate of 7 kg/hour. The conditions for synthesis of this SEBS are shown in Table 2. The amounts of functional groups and double bonds and the melt flow rate (MFR) are shown in Table 3.

The constitution of the twin-screw extruder used for the reaction and the conditions under which the extruder was driven are as follows:

Co-rotating twin-screw extruder TEM-35B (manufactured by Toshiba Machine Co., Ltd.)

| | |
|---|---|
| Screw diameter: | 37 mm$\phi$ |
| L/D: | 52 (15 blocks) |
| Liquid feeder: | C3 (Liquid feeder 1), C11 (Liquid feeder 2) |
| Vent position: | C6, C14 |
| Constitution of screw: | Seal rings were used between C5 and C6, between C10 and C11, and at C12. |
| Temperature setting: | |
| C1 | cooled with water |
| C2 to C3 | 200° C. |
| C4 to C15 | 250° C. |
| Die | 250° C. |
| Screw speed: | 400 rpm |

EXAMPLE 2

Kneading was carried out in the same manner as that in Example 1 except that the synthesis conditions in Example 1 were changed to those shown in Table 2. As a result, obtained was SEBS with the constitution and physical properties shown in Table 3.

EXAMPLE 3

Kneading was carried out in the same manner as that in Example 1 except that the starting material was changed to the SEBS with the constitution and physical properties shown in Table 1 which was prepared according to Synthesis Example 2 described above and that the synthesis conditions in Example 1 were changed to those shown in Table 2. As a result, obtained was SEBS with the constitution and physical properties shown in Table 3.

EXAMPLE 4

Kneading was carried out in the same manner as that in Example 3 except that the synthesis conditions in Example 3 were changed to those shown in Table 2. As a result, obtained was SEBS with the constitution and physical properties shown in Table 3.

EXAMPLE 5

Kneading was carried out in the same manner as that in Example 1 except that in Example 1 the starting material was changed to the styrene-hydrogenated isoprene-styrene block copolymer (SEPS) with the constitution and physical properties shown in Table 1 which was prepared according to Synthesis Example 3 described above and that the synthesis conditions were changed to those shown in Table 2. As a result, obtained was SEPS with the constitution and physical properties shown in Table 3.

EXAMPLE 6

Kneading was carried out in the same manner as that in Example 2 except that in Example 2 the starting material was changed to the SEBS with the constitution and physical properties shown in Table 1 which was prepared according to Synthesis Example 4 described above. As a result, obtained was SEBS with the constitution and physical properties shown in Table 3.

COMPARATIVE EXAMPLE 1

Kneading was carried out in the same manner as that in Example 1 except that in Example 1 the starting material was changed to the SEBS with the constitution and physical properties shown in Table 1 which was prepared according to Synthesis Example 5 described above and the synthesis conditions in Example 1 were changed to those shown in Table 2. As a result, no reaction product was obtained since the torque in the extruder increased to overtorque and, therefore, the screw stopped.

COMPARATIVE EXAMPLE 2

Kneading was carried out in the same manner as that in Example 2 except that in Example 2 the starting material was changed to the SEBS with the constitution and physical properties shown in Table 1 which was prepared according to Synthesis Example 6 described above. As a result, obtained was SEBS with the constitution and physical properties shown in Table 3.

COMPARATIVE EXAMPLE 3

In a pressure-resistant vessel with a capacity of 1.5 L, 500 g of cyclohexane and 0.003 mol of sec-butyllithium were placed and heated to 50° C. Subsequently, while that temperature was maintained, 15 g of styrene monomer was added dropwise and then 120 g of isoprene monomer was added dropwise. Thereafter, 15 g of styrene monomer was added dropwise. Subsequently, 0.7 mL (2 equivalents based on the anion living terminals) of trimethyl borate fully dewatered was added dropwise to the system and was allowed to react for 1 hour. Thereafter, a Ziegler catalyst prepared outside the system was added in an amount of 0.01 equivalent based on the carbon-carbon double bonds in the polymer, and then hydrogenation was carried out for 5 hours at a hydrogen pressure of 10 Kg/cm$^2$ and a hydrogenation temperature of 70° C. As a result, an SEPS with boronic acid groups was obtained. The styrene/isoprene weight ratio of this SEPS is shown in Table 1. The amounts of functional groups and double bonds and MFR of the SEPS are shown in Table 3.

COMPARATIVE EXAMPLE 4

Kneading was carried out in the same manner as that in Example 1 except that in Example 1 the starting material was changed to a very low density polyethylene (VLEPE, "EXCELLEN" (product name) EUL430, manufactured by Sumitomo Chemical) with the constitution and physical properties shown in Table 1 and that the synthesis conditions were changed to those shown in Table 2. As a result, obtained was VLDPE with the constitution and physical properties shown in Table 3.

TABLE 1

| | Polymer | Weight average molecular weight | Styrene/Diene (weight ratio) | 1,2/1,4[*1] (molar ratio) | Amount of double bonds ($\mu$eq/g) | Ratio of hydrogenation (mol %) | MFR[*2] (g/10 minutes, 2160 g) | Density (g/cm$^3$) |
|---|---|---|---|---|---|---|---|---|
| Example 1 | SEBS | 100400 | 18/82 | 47/53 | 430 | 97 | 5 | 0.89 |
| Example 2 | SEBS | 100400 | 18/82 | 47/53 | 430 | 97 | 5 | 0.89 |
| Example 3 | SEBS | 83000 | 14/86 | 32/68 | 770 | 95 | 20 | 0.89 |
| Example 4 | SEBS | 83000 | 14/86 | 32/68 | 770 | 95 | 20 | 0.89 |
| Example 5 | SEPS | 83000 | 16/84 | — | 930 | 92 | 2 | 0.89 |
| Example 6 | SEBS | 100400 | 30/70 | 47/53 | 1250 | 90 | 5 | 0.89 |
| Comparative Example 1 | SEBS | 100400 | 30/70 | 47/53 | 6000 | 52 | 5 | 0.89 |
| Comparative Example 2 | SEBS | 100400 | 30/70 | 47/53 | 85 | 99 | 4 | 0.89 |
| Comparative Example 3 | SEPS | 70000 | 20/80 | — | — | — | — | — |
| Comparative Example 4 | VLDPE | — | — | — | 47 | — | 4 | 0.9 |

TABLE 1-continued

| Polymer | Weight average molecular weight | Styrene/Diene (weight ratio) | 1,2/1,4*¹ (molar ratio) | Amount of double bonds (μeq/g) | Ratio of hydrogenation (mol %) | MFR*² (g/10 minutes, 2160 g) | Density (g/cm³) |
|---|---|---|---|---|---|---|---|

*¹The ratio of the 1,2-bonds to the 1,4-bonds in butadiene units.
*²Measurements at 190° C. for VLDPE and those at 230° C. for others.
SEBS: Styrene-hydrogenated butadiene-styrene block copolymer
SEPS: Styrene-hydrogenated isoprene-styrene block copolymer
VLDPE: Very low density polyethylene

TABLE 2

| | Polymer | Rate of feeding of resin (kg/hr) | Rate of feeding of TEAB/BBD (kg/hr) | Kind of diol | Rate of feeding diol (kg/hr) |
|---|---|---|---|---|---|
| Example 1 | SEBS | 7 | 0.6 | BD | 0.4 |
| Example 2 | SEBS | 7 | 0.6 | PG | 0.4 |
| Example 3 | SEBS | 7 | 0.9 | PG | 0.6 |
| Example 4 | SEBS | 6 | 1.2 | PG | 0.6 |
| Example 5 | SEPS | 6 | 1.2 | BD | 0.6 |
| Example 6 | SEBS | 7 | 0.6 | PG | 0.4 |
| Comparative Example 1 | SEBS | 7 | 0.6 | BD | 0.4 |
| Comparative Example 2 | SEBS | 7 | 0.6 | PG | 0.4 |
| Comparative Example 3 | SEPS | — | — | — | — |
| Comparative Example 4 | VLDPE | 13 | 0.6 | BD | 0.5 |

TEAB: Borane-triethylamine complex
BBD: Boric acid 1,3-butanediol ester
BD: 1,3-Butanediol
PG: Propylene glycol

TABLE 3

| | Kind of functional group | Amount of functional groups (μeq/g) | | Amount of double bonds (μeq/g) | MFR*³ (g/10 minutes, 2160 g) |
|---|---|---|---|---|---|
| Example 1 | BABDE | 210 | | 150 | 5 |
| Example 2 | BABDE BAPGE | 90 120 | 210 | 150 | 5 |
| Example 3 | BABDE BAPGE | 110 260 | 370 | 270 | 5 |
| Example 4 | BABDE BAPGE | 380 270 | 650 | 0 | 5 |
| Example 5 | BABDE | 520 | | 380 | 2 |
| Example 6 | BABDE BAPGE | 60 90 | 150 | 1100 | 5 |
| Comparative Example 1 | — | — | | — | — |
| Comparative Example 2 | BABDE BAPGE | 20 50 | 70 | 10 | 4 |
| Comparative Example 3 | BA | 13 | | 600 | 10 |
| Comparative Example 4 | BABDE | 40 | | 0 | 4 |

*³A measurement at 190° C. for Comparative Example 4 and those at 230° C. for others.
BABDE: Boronic acid 1,3-butanediol ester group
BAPGE: Boronic acid propylene glycol ester group
BA: Boronic acid group

EXAMPLE 7

A resin composition was obtained by melt-kneading the boronic acid ester group-containing SEBS obtained in Example 1 and a linear low density polyethylene (LLDPE: "Ultzex 2022L", manufactured by Mitsui Chemicals, Inc.) in a weight ratio of 25:75. The boronic acid ester group-containing SEBS had a branching degree (α) of 0.154 and the linear low density polyethylene had a branching degree (β) of 0.015. The absolute value of the difference between the branching degrees, |α−β|, was 0.139.

The construction and driving conditions of the twin-screw extruder used for the kneading are as follows:

Co-rotating twin-screw extruder Labo Plastomill (manufactured by Toyo Seiki)

| | |
|---|---|
| Screw construction: | Co-rotation twin-screw |
| Screw diameter: | 25 mmφ |
| L/D: | 25 |
| Temperature set: | 220° C. |
| Screw speed: | 150 rpm |
| Rate of feeding of resin: | 5 kg/hour |

In a saponification reactor, a 45% methanol solution of an ethylene-vinyl acetate copolymer (hereinafter, abbreviated as EVAc) having an ethylene content of 38 mol % was placed. Sodium hydroxide (an 80 g/L methanol solution) was added so that the amount thereof became 0.4 equivalent based on the vinyl acetate components in the EVAc, and the EVAc concentration was adjusted to 20% through addition of methanol. The resulting solution was heated to 60° C. and was allowed to react for about 4 hours while nitrogen gas was blown into the reactor. Thereafter, the reaction was stopped by means of addition of acetic acid. The reaction solution was extruded into water from a metal plate with a circular opening to coagulate, which was then cut into pellets (chips) with a diameter of about 3 mm and a length of about 5 mm. The pellets obtained were dewatered with a centrifugal separator and then operations of washing with a great amount of water and dewatering were repeated. 3.5 kg of the resulting water-containing EVOH pellets with a water content of 52% were immersed for 10 hours in 15 L of an aqueous solution containing 0.1 g/L of acetic acid, 0.04 g/L of potassium dihydrogenphosphate and 0.34 g of boric acid. The temperature of the aqueous solution was 25° C. Thereafter, the pellets were dewatered and then dried at 80° C. for 6 hours and 107° C. for additional 24 hours. The contents of every components contained in the resulting dry pellets were determined according to the following methods.

(7) Determination of the Content of Acetic Acid 20 g of dry EVOH pellets for use as a sample for test was added to 100 mL of ion-exchanged water and was heated and extracted at 95° C. for 6 hours. The extract was subjected to neutralization analysis with 1/50-N NaOH using phenolphthalein as an indicator. The content of acetic acid was determined by multiplying the molecular weight of the acid by the obtained molar number of the acid.

(8) Determination of the Amount of Alkali Metal Ion 10 g of dry EVOH pellets for use as a sample for test were added to 50 mL of a 0.01-N aqueous hydrogen chloride solution and was stirred at 95° C. for 6 hours. The aqueous solution resulting from the stirring was subjected to quantitative analysis by ion chromatography, thereby the amount of metal ion was determined. A column, ICS-C25, manufactured by Yokogawa Electric Corporation was used. An aqueous solution containing 5.0 mM of tartaric acid and 1.0 mM of 2,6-pyridinedicarboxylic acid was used as an eluent. For the quantitative determination, employed were calibration curves made for aqueous solutions of various kinds of metal salts such as an aqueous solution of sodium chloride and an aqueous solution of potassium chloride. From the amounts of alkali metal ions obtained in such a manner, the amounts of the alkali metal salts contained in the dry pellets were obtained as values in terms of metal elements.

(9) Determination of the Amount of Phosphoric Acid Compound 10 g of dry EVOH pellets for use as a sample for test were added to 50 ml of a 0.01-N aqueous hydrogen chloride solution and was stirred at 95° C. for 6 hours. The aqueous solution resulting from the stirring was subjected to quantitative analysis by ion chromatography, thereby the amount of phosphate ion was determined. A column, ICS-A23, manufactured by Yokogawa Electric Corporation was used. An aqueous solution containing 2.5 mM of sodium carbonate and 1.0 mM of sodium hydrogencarbonate was used as an eluent. For the quantitative determination, employed was a calibration curve made for an aqueous solution of sodium dihydrogenphosphate. From the amount of phosphate ion obtained in such a manner, the content of phosphoric acid compounds was obtained as a value in terms of phosphate radical.

(10) Determination of the Amount of Boron Compound 50 mg of dry pellets for use as a sample for test was burned completely by an oxygen flask combustion method. The burned ash was dissolved in 10 mL of a 1 mol/L aqueous nitric acid solution.

The above described solution was subjected to quantitative analysis by high-frequency plasma emission analysis using an ICP emission analyzer, IRIS AP, manufactured by Jarrell Ash. The content of boron compounds was obtained as a value in terms of boron element.

The resulting dry chips of EVOH had a saponification degree of 99.7 mol % and a melt flow rate (MFR) of 1.7 g/10 min (190° C., 2160 kg load). The dry EVOH pellets obtained have an acetic acid content of 50 ppm, an alkali metal salt content, in terms of metal element, of 20 ppm, a phosphoric acid compound content, in terms of phosphate radical, of 20 ppm, and a boron compound content, in terms of boron element, of 260 ppm.

Next, a 3-kind 5-layer sheet comprising a linear low density polyethylene (LLDPE: "Ultzex 2022L", manufactured by Mitsui Chemicals, Inc.), the above described resin composition, and the above described EVOH was produced by co-extrusion according to the following production conditions. The T-type peel strength between the resin composition layer and the EVOH layer in the sheet obtained immediately after the formation of the 3-kind 5-layer film was measured with an Autograph (tensile rate: 250 mm/min) under conditions of 20° C.-65% RH. The value obtained was taken as an interlayer adhesion. The interlayer adhesion was 1090 g/15 mm. The result is shown in Table 4.

The constitution and driving conditions of the extruder used for molding are as follows:

Extruder 1 (LLDPE): 32 mmφ, single screw, Model GT-32-A (manufactured by Research Laboratory of Plastics Technology)

Screw speed: 62 rpm, temperature set: 250° C.

Extruder 2 (resin composition): 25 mmφ, single screw, Model P25-18AC (manufactured by Osaka Seiki)

Screw speed: 30 rpm, temperature set: 250° C.

Extruder 3 (EVOH): 20 mmφ, single screw, Labo ME-type CO-EXT (manufactured by Toyo Seiki)

Screw speed: 18 rpm, temperature set: 250° C.

T-die: 300 mm wide, for 3 kinds and 5 layers (manufactured by Research Laboratory of Plastics Technology)

Temperature set: 250° C.

Layer constitution: LLDPE/Resin Composition/EVOH/Resin Composition/LLDPE

Thickness constitution: 50 μm/10 μm/10 μm/10 μm/50 μm

EXAMPLE 8

A resin composition was obtained by melt-kneading the boronic ester group-containing SEBS obtained in Example 2 and LLDPE ("Ultzex 2022U", manufactured by Mitsui Chemicals, Inc.) in a weight ratio of 10:90 in the same manner as that in Example 7. The above described boronic ester group-containing SEBS had a branching degree ($\alpha$) of 0.154 and the above described linear low density polyethylene had a branching degree ($\beta$) of 0.015. The absolute value of the difference between the branching degrees, $|\alpha-\beta|$, was 0.139. A 3-kind 5-layer sheet was produced by co-extrusion in the same manner as that in Example 7 except that this resin composition was used. The interlayer adhesion between the resin composition layer and the EVOH layer of the resulting sheet was measured to be 980 g/15 mm. This result is shown in Table 4.

EXAMPLE 9

A resin composition was obtained by melt-kneading the boronic ester group-containing SEBS obtained in Example 3 and LLDPE ("Ultzex 2022L", manufactured by Mitsui Chemicals, Inc.) in a weight ratio of 5:95 in the same manner as that in Example 7. The above described boronic ester group-containing SEBS had a branching degree ($\alpha$) of 0.095 and the above described linear low density polyethylene had a branching degree ($\beta$) of 0.015. The absolute value of the difference between the branching degrees, $|\alpha-\beta|$, was 0.080. A 3-kind 5-layer sheet was produced by co-extrusion in the same manner as that in Example 7 except that this resin composition was used. The interlayer adhesion between the resin composition layer and the EVOH layer of the resulting sheet was measured to be 1000 g/15 mm. This result is shown in Table 4.

EXAMPLE 10

A resin composition was obtained by melt-kneading the boronic ester group-containing SEBS obtained in Example 4 and LLDPE ("Ultzex 2022L", manufactured by Mitsui Chemicals, Inc.) in a weight ratio of 5:95 in the same manner as that in Example 7. The above described boronic ester group-containing SEBS had a branching degree (α) of 0.95 and the above described linear low density polyethylene had a branching degree (β) of 0.015. The absolute value of the difference between the branching degrees, |α–β|, was 0.080. A 3-kind 5-layer sheet was produced by co-extrusion in the same manner as that in Example 7 except that this resin composition was used. The interlayer adhesion between the resin composition layer and the EVOH layer of the resulting sheet was measured to be 1100 g/15 mm. This result is shown in Table 4.

EXAMPLE 11

A resin composition was obtained by melt-kneading the boronic ester group-containing SEPS obtained in Example 5 and a polypropylene ("Noblen EA7A", manufactured by Japan Polychem) in a weight ratio of 5:95 in the same manner as that in Example 7. The above described boronic ester group-containing SEPS had a branching degree (α) of 0.335 and the above described polypropylene had a branching degree (β) of 0.499. The absolute value of the difference between the branching degrees, |α–β|, was 0.164. A 3-kind 5-layer sheet was produced by co-extrusion in the same manner as that in Example 7 except that the above described polypropylene, the above described resin composition and the EVOH used in Example 7 were used as constituents of layers. The interlayer adhesion between the resin composition layer and the EVOH layer of the resulting sheet was measured to be 1000 g/15 mm. This result is shown in Table 4.

COMPARATIVE EXAMPLE 5

A 3-kind 5-layer sheet was produced by co-extrusion in the same manner as that in Example 7 except that LLDPE ("Ultzex 2022L", manufactured by Mitsui Chemicals, Inc.), maleic anhydride-modified polyethylene ("Bynel™ 4125" manufactured by E.I. DuPont de Nemours & Company) and the EVOH used in Example 7 were used as constituents of layers. The interlayer adhesion between the resin composition layer and the EVOH layer of the resulting sheet was measured to be 130 g/15 mm. This result is shown in Table 4.

COMPARATIVE EXAMPLE 6

A resin composition was obtained by melt-kneading the boronic ester group-containing SEBS obtained in Comparative Example 2 and LLDPE ("Ultzex 2022L", manufactured by Mitsui Chemicals, Inc.) in a weight ratio of 25:75 in the same manner as that in Example 7. A 3-kind 5-layer sheet was produced by co-extrusion in the same manner as that in Example 7 except that this resin composition was used. The interlayer adhesion between the resin composition layer and the EVOH layer of the resulting sheet was measured to be 150 g/15 mm. This result is shown in Table 4.

COMPARATIVE EXAMPLE 7

A resin composition was obtained by melt-kneading the boronic ester group-containing SEPS obtained in Comparative Example 3 and LLDPE ("Ultzex 2022L", manufactured by Mitsui Chemicals, Inc.) in a weight ratio of 50:50 in the same manner as that in Example 7. A 3-kind 5-layer sheet was produced by co-extrusion in the same manner as that in Example 7 except that this resin composition was used. The interlayer adhesion between the resin composition layer and the EVOH layer of the resulting sheet was measured to be 50 g/15 mm. This result is shown in Table 4.

COMPARATIVE EXAMPLE 8

A resin composition was obtained by melt-kneading the boronic ester group-containing VLDPE obtained in Comparative Example 4 and LLDPE ("Ultzex 2022L", manufactured by Mitsui Chemicals, Inc.) in a weight ratio of 25:75 in the same manner as that in Example 7. A 3-kind 5-layer sheet was produced by co-extrusion in the same manner as that in Example 7 except that this resin composition was used. The interlayer adhesion between the resin composition layer and the EVOH layer of the resulting sheet was measured to be 100 g/15 mm. This result is shown in Table 4.

TABLE 4

|  | Layer constitution | | | | | Adhesion of extruded sheet (g/15 mm) |
|---|---|---|---|---|---|---|
|  | (D) Thermoplastic resin | (C) Composition | | | (E) EVOH |  |
|  |  | (A) Block copolymer | (B) Thermoplastic resin | (A)/(B) Weight ratio |  |  |
| Example 7 | LLDPE | Example 1 | LLDPE | 25/75 | EVOH | 1090 |
| Example 8 | LLDPE | Example 2 | LLDPE | 10/90 | EVOH | 980 |
| Example 9 | LLDPE | Example 3 | LLDPE | 5/95 | EVOH | 1000 |
| Example 10 | LLDPE | Example 4 | LLDPE | 5/95 | EVOH | 1100 |
| Example 11 | PP | Example 5 | PP | 5/95 | EVOH | 1000 |
| Comparative Example 5 | LLDPE | Bynel ™ | — | 100/0 | EVOH | 130 |
| Comparative Example 6 | LLDPE | Comparative Example 2 | LLDPE | 25/75 | EVOH | 150 |
| Comparative Example 7 | LLDPE | Comparative Example 3 | LLDPE | 50/50 | EVOH | 50 |

TABLE 4-continued

|  | | Layer constitution | | | | Adhesion of extruded sheet (g/15 mm) |
|---|---|---|---|---|---|---|
|  | (D) Thermoplastic resin | (A) Block copolymer | (C) Composition | | | |
|  |  |  | (B) Thermoplastic resin | (A)/(B) Weight ratio | (E) EVOH | |

| | (D) Thermoplastic resin | (A) Block copolymer | (B) Thermoplastic resin | (A)/(B) Weight ratio | (E) EVOH | Adhesion of extruded sheet (g/15 mm) |
|---|---|---|---|---|---|---|
| Comparative Example 8 | LLDPE | Comparative Example 4 | LLDPE | 25/75 | EVOH | 100 |

SYNTHESIS EXAMPLE 7 (USED IN EXAMPLE 12)

In a 200 L pressure-resistant vessel filled with dry nitrogen, 75 kg of cyclohexane as a solvent and 45 g of sec-butyllithium as a polymerization initiator were added and, subsequently, 3.4 kg of styrene was added. After polymerization at 50° C., 0.21 kg of tetrahydrofuran as a Lewis base was added and, subsequently, 33.2 kg of butadiene and 3.4 kg of styrene were added in this order. When polymerization was carried out, a triblock copolymer of styrene-butadiene-styrene type was obtained. The block copolymer had a branching degree ($\alpha$) of 0.150. The block copolymer obtained was subjected to hydrogenation at a hydrogen pressure of 2 MPa and a reaction temperature of 100° C. in cyclohexane using Pd/C as a catalyst, yielding a styrene-hydrogenated butadiene-styrene block copolymer (SEBS). The resulting block copolymer had a weight average molecular weight of 100900, a styrene content of 17% by weight, and a ratio of hydrogenation of 95 mol %.

EXAMPLE 12

An SEBS containing a group of 1,3-butanediol ester of boronic acid was obtained in the same manner as that in Example 1 except that the styrene-hydrogenated butadiene-styrene block copolymer (SEBS) prepared according to the above described Synthesis Example 7 was used as a starting material, the feed speed of the mixed solution of borane-triethylamine complex (TEAB) and 1,3-butanediol ester of boric acid (BBD) (TEAB/BBD=29/71, weight ratio) was changed to 1.5 kg/hour, and the feed speed of 1,3-butanediol was changed to 0.9 kg/hour. The resulting SEBS had functional groups in a total amount of 450 $\mu$eq/g (a group of 1,3-butanediol ester of boronic acid: 310 $\mu$eq/g; a group of propylene glycol ester of boronic acid: 140 $\mu$eq/g), and double bonds in an amount of 130 $\mu$eq/g. The $^1$H-NMR chart of the resulting SEBS having a boron-containing group is shown in FIG. 1.

EXAMPLE 13

A resin composition was obtained by melt-kneading the boronic ester group-containing SEBS obtained in Example 12 and a linear low density polyethylene (LLDPE: "Ultzex 2022L", manufactured by Mitsui Chemicals, Inc.) in a weight ratio of 5:95 in the same manner as that in Example 7. The boronic ester group-containing SEBS had a branching degree ($\alpha$) of 0.150 and the linear low density polyethylene had a branching degree ($\beta$) of 0.015. The absolute value of the difference between ($\alpha$) the branching degree of the boronic ester group-containing SEBS and ($\beta$) the branching degree of the linear low density polyethylene, $|\alpha-\beta|$, was 0.135. Further, the boronic ester group-containing SEBS had a content of hydrogen of methyl groups of diene block, ($\gamma$), of 0.16 and the linear low density polyethylene had a content of hydrogen of methyl groups, ($\delta$), of 0.04. The absolute value of the difference between the contents, $|\gamma-\delta|$, was 0.12.

A 3-kind 5-layer sheet was produced by co-extrusion in the same manner as that in Example 7 except that the above described linear low density polyethylene, the above described resin composition and the EVOH used in Example 7 were used as constituents of layers. The T-type peel strength between the resin composition layer and the EVOH layer in the sheet obtained immediately after the formation of the 3-kind 5-layer film was measured with an Autograph (tensile rate: 250 mm/min) under conditions of 20° C.-65% RH. The value obtained was taken as an interlayer adhesion. The interlayer adhesion was 1100 g/15 mm. A considerably excellent adhesion was shown. The resulting multilayer sheet was excellent in surface smoothness and had a good appearance.

EXAMPLE 14

A resin composition was obtained by melt-kneading the boronic ester group-containing SEBS obtained in Example 12 and a polypropylene ("Noblen EA7A", manufactured by Japan Polychem) in a weight ratio of 50:50 in the same manner as that in Example 7. The boronic ester group-containing SEBS had a branching degree ($\alpha$) of 0.150 and the polypropylene had a branching degree ($\beta$) of 0.499. The absolute value of the difference between ($\alpha$) the branching degree of the boronic ester group-containing SEBS and ($\beta$) the branching degree of the polypropylene, $|\alpha-\beta|$, was 0.349. Further, the boronic ester group-containing SEBS had a content of hydrogen of methyl groups of diene block, ($\gamma$), of 0.16 and the polypropylene had a content of hydrogen of methyl groups, ($\delta$), of 0.49. The absolute value of the difference between the contents, $|\gamma-\delta|$, was 0.33.

A 3-kind 5-layer sheet was produced by co-extrusion in the same manner as that in Example 7 except that the above described polypropylene, the above described resin composition and the EVOH used in Example 7 were used as constituents of layers. The T-type peel strength between the resin composition layer and the EVOH layer in the sheet obtained immediately after the formation of the 3-kind 5-layer film was measured with an Autograph (tensile rate: 250 mm/min) under conditions of 20° C.-65% RH. The value obtained was taken as an interlayer adhesion. The interlayer adhesion was 600 g/15 mm. The resulting multilayer sheet was inferior in surface smoothness to the multilayer sheet obtained in Example 13.

EXAMPLE 15

A resin composition was obtained by melt-kneading the boronic ester group-containing SEBS obtained in Example 12 and a polypropylene ("Noblen EA7A", manufactured by Japan Polychem) in a weight ratio of 25:75 in the same manner as that in Example 7. The boronic ester group-containing SEBS had a branching degree ($\alpha$) of 0.150 and the polypropylene had a branching degree ($\beta$) of 0.499. The absolute value of the difference between ($\alpha$) the branching degree of the boronic ester group-containing SEBS and ($\beta$) the branching degree of the polypropylene, $|\alpha-\beta|$, was 0.349. Further, the boronic ester group-containing SEBS had a content of hydrogen of methyl groups of diene block, ($\gamma$), of 0.16 and the polypropylene had a content of hydrogen of methyl groups, ($\delta$), of 0.49. The absolute value of the difference between the contents, $|\gamma-\delta|$, was 0.33.

A 3-kind 5-layer sheet was produced by co-extrusion in the same manner as that in Example 7 except that the above described polypropylene, the above described resin composition and the EVOH used in Example 7 were used as constituents of layers. The T-type peel strength between the resin composition layer and the EVOH layer in the sheet obtained immediately after the formation of the 3-kind 5-layer film was measured with an Autograph (tensile rate: 250 mm/min) under conditions of 20° C.-65% RH. The value obtained was taken as an interlayer adhesion. The interlayer adhesion was 250 g/15 mm.

As can be seen from the comparison of Examples 13 to 15, the interlayer adhesion obtained when an absolute value of the difference between ($\alpha$) the branching degree of a styrene-hydrogenated diene block copolymer (A) and ($\beta$) the branching degree of a polyolefin (B1), $|\alpha-\beta|$, is 0.25 or less is better than that obtained when the absolute value exceeds 0.25. Further, the interlayer adhesion obtained when an absolute value of the difference between their contents of hydrogen of methyl groups, $|\gamma-\delta|$, is 0.25 or less is better than that obtained when the absolute value exceeds 0.25. Meanwhile, although it is possible to improve the adhesiveness to some extent by increasing the content of a styrene-hydrogenated diene block copolymer (A) in a resin composition (C), the surface smoothness of the surface of a resulting sheet became poor in such a case.

SYNTHESIS EXAMPLE 8 (USED IN EXAMPLE 16)

In a 200 L pressure-resistant vessel filled with dry nitrogen, 75 kg of cyclohexane as a solvent and 21 g of sec-butyllithium as a polymerization initiator were added and, subsequently, 2.5 kg of styrene was added. After polymerization at 50° C., 0.59 kg of tetrahydrofuran as a Lewis base was added and, subsequently, 20 kg of isoprene and 2.5 kg of styrene were added in this order. When polymerization was carried out, a triblock copolymer of styrene-isoprene-styrene type was obtained. The block copolymer had a branching degree ($\alpha$) of 0.335. The block copolymer obtained was subjected to hydrogenation at a hydrogen pressure of 2 MPa and a reaction temperature of 100° C. in cyclohexane using Pd/C as a catalyst, yielding a styrene-hydrogenated isoprene-styrene block copolymer (SEPS). The resulting block copolymer had a weight average molecular weight of 100000, a styrene content of 20% by weight, and a ratio of hydrogenation of 91 mol %.

EXAMPLE 16

Figure 2:
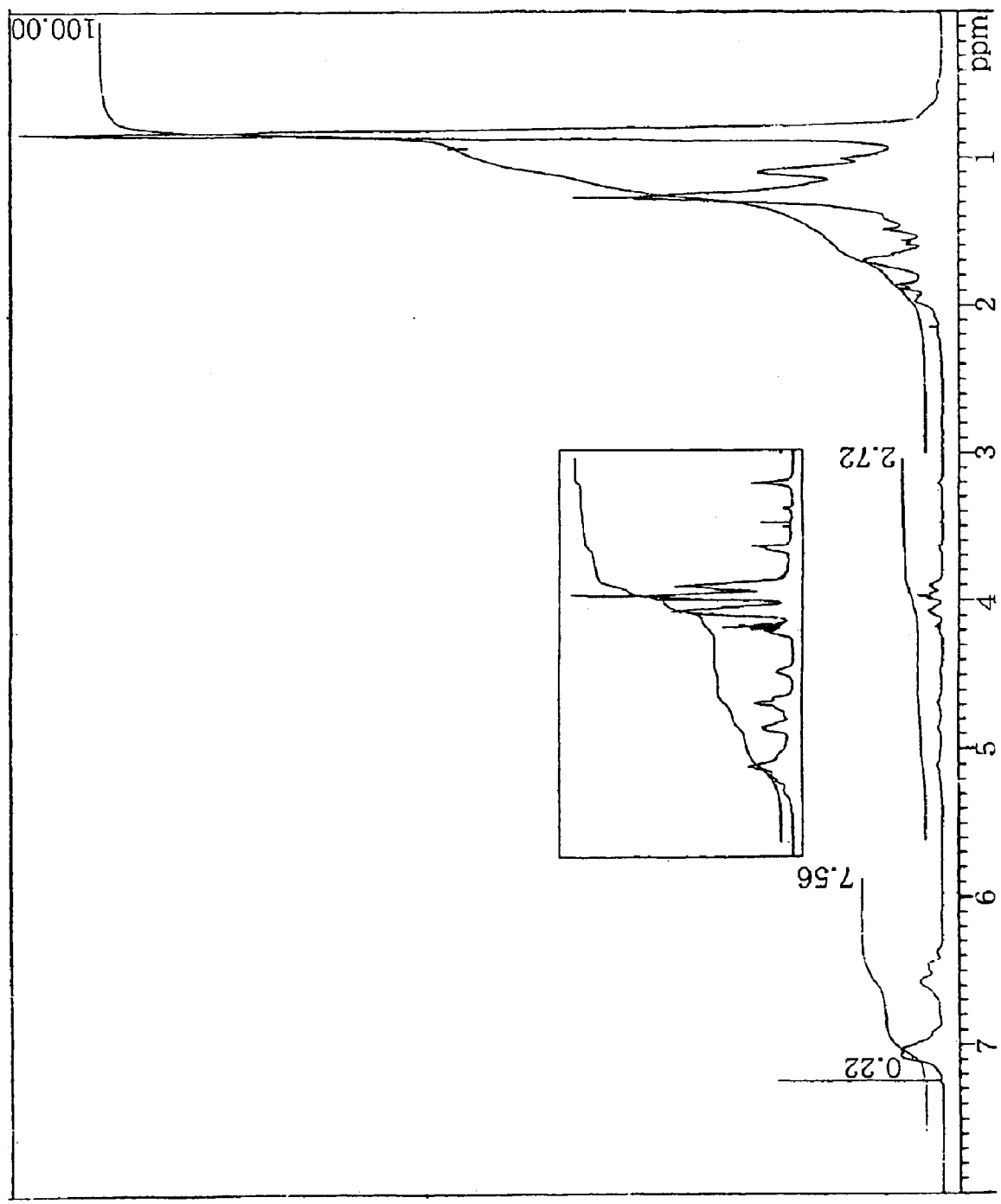
FIG. 2 shows the $^1$H-NMR chart of the styrene-hydrogenated isoprene-styrene block copolymer (SEPS) having a boron-containing group of Example 16.

An SEPS containing a group of 1,3-butanediol ester of boronic acid was obtained in the same manner as that in Example 1 except that the styrene-hydrogenated isoprene-styrene block copolymer (SEPS) prepared according to the above described Example 1 was used as a starting material, the feed speed of the mixed solution of borane-triethylamine complex (TEAB) and 1,3-butanediol ester of boric acid (BBD) (TEAB/BBD=29/71, weight ratio) was changed to 1.4 kg/hour, and the feed speed of 1,3-butanediol was changed to 0.9 kg/hour. The resulting SEBS had functional groups in a total amount of 580 µeq/g (a group of 1,3-butanediol ester of boronic acid: 490 µeq/g; a group of propylene glycol ester of boronic acid: 90 µeq/g), and double bonds in an amount of 430 µeq/g. The $^1$H-NMR chart of the resulting SEPS having a boron-containing group is shown in FIG. 2.

EXAMPLE 17

A resin composition was obtained by melt-kneading the boronic ester group-containing SEBS obtained in Example 12 and a polypropylene ("Noblen EA7A", manufactured by Japan Polychem) in a weight ratio of 10:90 in the same manner as that in Example 7. The boronic ester group-containing SEPS had a branching degree ($\alpha$) of 0.335 and the polypropylene had a branching degree ($\beta$) of 0.499. The absolute value of the difference between ($\alpha$) the branching degree of the boronic ester group-containing SEPS and ($\beta$) the branching degree of the polypropylene, $|\alpha-\beta|$, was 0.164. Further, the boronic ester group-containing SEPS had a content of hydrogen of methyl groups of diene block, ($\gamma$), of 0.45 and the polypropylene had a content of hydrogen of methyl groups, ($\delta$), of 0.49. The absolute value of the difference between the contents, $|\gamma-\delta|$, was 0.04.

A 3-kind 5-layer sheet was produced by co-extrusion in the same manner as that in Example 7 except that the above described polypropylene, the above described resin composition and the EVOH used in Example 7 were used as constituents of layers. The T-type peel strength between the resin composition layer and the EVOH layer in the sheet obtained immediately after the formation of the 3-kind 5-layer film was measured with an Autograph (tensile rate: 250 mm/min) under conditions of 20° C.-65% RH. The value obtained was taken as an interlayer adhesion. The interlayer adhesion was 600 g/15 mm and an excellent adhesiveness was exhibited. The resulting multilayer sheet was excellent in surface smoothness and had a good appearance.

INDUSTRIAL APPLICABILITY

As described above, the styrene-hydrogenated diene block copolymer of the present invention has good compatibility with and good adhesiveness to other resins such as polyolefin. It, therefore, can be used, alone or in the form of a composition with other resins, as a compatibility modifier or an adhesion modifier.

What is claimed is:

1. A method for producing a styrene-hydrogenated diene block copolymer (A), comprising:

introducing at least one functional group selected from the group consisting of a boronic acid group and boron-containing groups capable of being converted into a boric acid group in the presence of water, by an addition reaction, to an olefinic double bond of a starting styrene-hydrogenated diene block copolymer;

thereby obtaining said styrene-hydrogenated diene block copolymer (A) which contains in its side chain said at least one functional group;

wherein an amount of said functional group contained in the block copolymer (A) is 100 to 2000 μeq/g and a weight ratio of styrene units to hydrogenated diene units contained in the block copolymer (A), [(styrene unit)/(hydrogenated diene unit)], is 5/95 to 70/30.

2. The method for producing the styrene-hydrogenated diene block copolymer (A) according to claim 1, wherein the ratio of hydrogenation of the diene block in the starting styrene-hydrogenated diene block copolymer is 90 to 98 mol %.

3. The method for producing the styrene-hydrogenated diene block copolymer (A) according to claim 1, wherein the starting styrene-hydrogenated diene block copolymer and a boron compound having a boron hydrogen bond are melt-kneaded in an extruder.

4. The method according to claim 1, wherein an amount of olefinic double bonds contained in the styrene-hydrogenated diene block copolymer (A) is 2000 μeq/g or less.

5. The method according to claim 1, wherein the diene monomer that constitutes the hydrogenated diene block is butadiene and/or isoprene.

6. The method according to claim 1, wherein the functional group is a cyclic boronic ester group.

7. The method according to claim 1, wherein the styrene-hydrogenated diene block copolymer (A) has a weight average molecular weight of 1000 to 1000000.

8. A thermoplastic resin composition (C), comprising:

(A) a styrene-hydrogenated diene block copolymer containing in its side chain at least one functional group selected from the group consisting of a boronic acid group and boron-containing groups capable of being converted into a boronic acid group in the presence of water, wherein an amount of said functional group contained in the block copolymer (A) is 100 to 2000 μeq/g and a weight ratio of styrene units to hydrogenated diene units contained in the block copolymer (A), [(styrene unit)/(hydrogenated diene unit)], is 5/95 to 70/30; and (B) a thermoplastic resin other than (A) in a weight ratio, [(A)/(B)], of 1/99 to 50/50;

wherein the thermoplastic resin (B) is a polyolefin (B 1);

wherein the thermoplastic resin composition (C) satisfies formula (1) below:

$$|\alpha - \beta| \leq 0.25 \tag{1}$$

where α is the branching degree of the diene block in the block copolymer (A) and β is the branching degree of the polyolefin (B1).

9. The thermoplastic resin composition (C) according to claim 8, wherein the thermoplastic resin composition (C) satisfies formula (2) below:

$$|\gamma - \delta| \leq 0.25 \tag{2}$$

where γ is the content of hydrogen of methyl groups in diene block of the block copolymer (A) and δ is the content of hydrogen of methyl groups of the polyolefin (B1).

10. An adhesive, comprising:

the thermoplastic resin composition (C) according to claim 8.

11. A multilayer structure, comprising:

a layer of the thermoplastic resin composition (C) according to claim 8; and a layer of a thermoplastic resin (D) other than (A).

12. The multilayer structure according to claim 11, wherein the thermoplastic resin (B) contained in the layer of the thermoplastic resin composition (C) is a polyolefin (B1) and the thermoplastic resin (D) constituting the layer of the thermoplastic resin (D) is a polyolefin (D1).

13. The multilayer structure according to claim 12, wherein both the polyolefin (B1) and the polyolefin (D1) are polyolefins each of which contains 50% by weight or more of the same α-olefin as their constituents.

14. The multilayer structure according to claim 11, wherein a layer of an ethylene-vinyl alcohol copolymer (E) and the layer of the thermoplastic resin (D) are laminated through the layer of the thermoplastic resin composition (C).

15. The multilayer structure according to claim 14, wherein the content of an alkali metal salt in the ethylene-vinyl alcohol copolymer (E) is 100 ppm or less in terms of the weight of the metal element.

16. The multilayer structure according to claim 11, wherein the multilayer structure is obtained by co-extrusion or multilayer injection.

17. A thermoplastic resin composition (C), comprising:

(A) a styrene-hydrogenated diene block copolymer containing in its side chain at least one functional group selected from the group consisting of a boronic-acid group and boron-containing groups capable of being converted into a boronic acid group in the presence of water, wherein an amount of said functional group contained in the block copolymer (A) is 100 to 2000 μeq/g and a weight ratio of styrene units to hydrogenated diene units contained in the block copolymer (A), [(styrene unit)/(hydrogenated diene unit)], is 5/95 to 70/30; and (B) a thermoplastic resin other than (A) in a weight ratio, [(A)/(B)], of 1/99 to 50/50;

wherein the thermoplastic resin (B) is a polyolefin (B 1);

wherein the thermoplastic resin composition (C) satisfies formula (2) below:

$$|\gamma - \delta| \leq 0.25 \tag{2}$$

where γ is the content of hydrogen of methyl groups in diene block of the block copolymer (A) and δ is the content of hydrogen of methyl groups of the polyolefin (B1).

18. The thermoplastic resin composition (C) according to claim 17, wherein the thermoplastic resin composition (C) satisfies formula (1) below:

$$|\alpha-\beta| \leqq 0.25 \qquad (1)$$

where α is the branching degree of the diene block in the block copolymer (A) and β is the branching degree of the polyolefin (B1).

19. An adhesive, comprising:
the thermoplastic resin composition (C) according to claim 17.

20. A multilayer structure, comprising:
a layer of the thermoplastic resin composition (C) according to claim 17; and
a layer of a thermoplastic resin (D) other than (A).

21. The multilayer structure according to claim 20, wherein the thermoplastic resin (B) contained in the layer of the thermoplastic resin composition (C) is a polyolefin (B1) and the thermoplastic resin (D) constituting the layer of the thermoplastic resin (D) is a polyolefin (D1).

22. The multilayer structure according to claim 21, wherein both the polyolefin (B1) and the polyolefin (D1) are polyolefins each of which contains 50% by weight or more of the same α-olefin as their constituents.

23. The multilayer structure according to claim 20, wherein a layer of an ethylene-vinyl alcohol copolymer (E) and the layer of the thermoplastic resin (D) are laminated through the layer of the thermoplastic resin composition (C).

24. The multilayer structure according to claim 23, wherein the content of an alkali metal salt in the ethylene-vinyl alcohol copolymer (E) is 100 ppm or less in terms of the weight of the metal element.

25. The multilayer structure according to claim 20, wherein the multilayer structure is obtained by co-extrusion or multilayer injection.

* * * * *